US 6,629,094 B1

(12) United States Patent
Colby et al.

(10) Patent No.: US 6,629,094 B1
(45) Date of Patent: *Sep. 30, 2003

(54) SYSTEM AND METHOD FOR REWRITING RELATIONAL DATABASE QUERIES

(75) Inventors: Latha S. Colby, Los Altos, CA (US); Richard L. Cole, Los Gatos, CA (US); Edward P. Haslam, San Francisco, CA (US); Nasi Jazayeri, Santa Clara, CA (US); Galt Johnson, Campbell, CA (US); William McKenna, Santa Cruz, CA (US); Lee E. Schumacher, Los Altos, CA (US); David G. Wilhite, Jr., Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/654,208

(22) Filed: Sep. 1, 2000

Related U.S. Application Data

(63) Continuation of application No. 09/049,784, filed on Mar. 27, 1998, now Pat. No. 6,199,063.

(51) Int. Cl.[7] .............................................. G06F 17/30
(52) U.S. Cl. .............................. 707/4; 707/2; 707/102; 707/103 R; 707/104.1
(58) Field of Search ........................ 707/1–7, 100–104

(56) References Cited

U.S. PATENT DOCUMENTS

| 5,367,675 A | | 11/1994 | Cheng et al. ............. 395/600 |
|---|---|---|---|
| 5,369,761 A | * | 11/1994 | Conley et al. ................. 707/2 |
| 5,598,559 A | | 1/1997 | Chaudhuri .................. 395/602 |
| 5,600,829 A | * | 2/1997 | Tsatalos et al. ................ 707/2 |
| 5,659,725 A | * | 8/1997 | Levy et al. .................... 707/3 |
| 5,659,728 A | | 8/1997 | Bhargava et al. ........... 395/602 |
| 5,897,632 A | * | 4/1999 | Dar et al. ..................... 707/2 |
| 5,987,450 A | * | 11/1999 | Levy ............................ 707/3 |
| 5,991,754 A | * | 11/1999 | Raitto et al. ................... 707/2 |
| 6,006,214 A | * | 12/1999 | Carey et al. ................... 707/2 |
| 6,026,390 A | * | 2/2000 | Ross et al. ..................... 707/2 |
| 6,061,676 A | * | 5/2000 | Srivastava et al. ............. 707/3 |
| 6,212,524 B1 | * | 4/2001 | Weissman et al. .......... 707/101 |
| 6,334,128 B1 | * | 12/2001 | Norcott et al. ................. 707/5 |
| 6,430,548 B1 | * | 8/2002 | Deis et al. ..................... 707/2 |

OTHER PUBLICATIONS

Srivastava, et al., *Answering Queries with Aggregation Using Views*, Proceedings of the 22nd VLDB Conference, Mumbai (Bombay), India, 1996.

Harinarayan, et al., *Implementing Data Cubes Efficiently*, SIGMOD '96, 06/96, Montreal, Canada.

* cited by examiner

*Primary Examiner*—Shamid Al Alam
(74) *Attorney, Agent, or Firm*—Jawaki K. Davda; Konrap, Raynes Victor & Mann LLP

(57) ABSTRACT

A system and method for answering a relational database query is presented. According to an embodiment of the present invention, a database query is received. It is then determined whether that query can be rewritten in such a manner as to be able to utilize a precomputed view, such that an answer to the rewritten query is equivalent to an answer to the original query. If the query can be rewritten, it is determined whether the rewritten query can more efficiently derive the answer than the original query. The query which has the most efficiently derived answer is the query which is utilized to derive that answer.

30 Claims, 25 Drawing Sheets

Product

| prod ID | product type | ... | bar code | ... |
|---|---|---|---|---|
| 1 | cereal x | · | | |
| 2 | toy y | · | | |
| 3 | paint z | · | | |

FIG. 1A

Sales

| time key | prod ID | Dollars | ... |
|---|---|---|---|
| 1/1/98-12:00 | 1 | 10 | |
| 1/1/98-12:01 | 1 | 13 | |
| 1/2/98-13:07 | 2 | 18 | |
| 1/2/98-14:02 | 3 | 7 | |

FIG. 1B

Time

| time key | day | month | year | ... |
|---|---|---|---|---|
| 1/1/98-12:00 | 1/1/98 | 1/98 | 98 | |
| 1/1/98-12:01 | 1/1/98 | 1/98 | 98 | |
| 1/1/98-12:02 | 1/1/98 | 1/98 | 98 | |
| ⋮ | ⋮ | ⋮ | ⋮ | |
| 2/1/98-12:00 | 2/1/98 | 2/98 | 98 | |
| 2/1/98-12:01 | 2/1/98 | 2/98 | 98 | |

FIG. 1C

Result

| time key | prod ID | dollars | day | prod_type |
|---|---|---|---|---|
| 1/1/98-12:00 | 1 | 10 | 1/1/98 | cereal x |
| 1/1/98-12:01 | 1 | 13 | 1/1/98 | cereal x |
| 1/2/98-13:07 | 2 | 18 | 1/2/98 | toy y |
| 1/2/98-14:02 | 3 | 7 | 1/2/98 | paint z |

FIG. 1D

Sum_Dollars_by_Day

| Day | Sum_Dollars |
|---|---|
| 1/1/98 | 100 |
| 1/2/98 | 150 |
| ⋮ | ⋮ |
| 2/1/98 | 300 |
| ⋮ | ⋮ |

FIG. 5A

Derived

| Day | Month |
|---|---|
| 1/1/98 | 1/98 |
| 1/2/98 | 1/98 |
| ⋮ | ⋮ |
| 2/1/98 | 2/98 |
| ⋮ | ⋮ |

FIG. 5B

| Month | Sum |
|---|---|
| 1/98 | 250 |
| 2/98 | 300 |

FIG. 5C

SYSTEM AND METHOD FOR REWRITING RELATIONAL DATABASE QUERIES

RELATED APPLICATIONS

This application is a continuation of application Ser. No. 09/049,784 filed on Mar. 27, 1998, now U.S. Pat. No. 6,199,063.

FIELD OF THE INVENTION

The present invention relates to answering relational database queries. In particular, the present invention provides a system and method which relates to answering relational database queries by rewriting the query using hierarchical relationships between data.

BACKGROUND OF THE INVENTION

A database is a collection of data, usually pertaining to some reasonably well defined purpose. In order to say that data has been stored in a database, as opposed to just being stored, certain conditions are typically satisfied. The data typically has a known format which is defined by metadata. Metadata is generally understood as data about data. The data in a database is typically stored, retrieved, and modified by a special type of computer program.

This special type of computer program is typically a database management system. A database management system (DBMS) is a special computer program built to store data into, retrieve data from, and modify data stored in a database.

A relational database management system is a type of database management system that stores information in tables, in rows and columns of data, and conducts searches. In a relational database, the rows of a table typically represent records (collections of information about separate items) and the columns typically represent fields (particular attributes of a record). In conducting searches, a relational database may match information from a field in one table with information in a corresponding field of another table to produce a third table that combines requested data from both tables. For example, if one table contains the fields EMPLOYEE-ID, LAST-NAME, FIRST-NAME, DEPT-ID, SALARY and HIRE-DATE, and another table contains the fields DEPT-ID, DEPT-NAME, and LOCATION, a relational database can match the DEPT-ID fields in the two tables to find such information as the names of all employees working in a department in a specified location. A relational database may use matching values in two tables to relate information in one to information in the other.

When querying a relational data base, a data sublanguage known as SQL is commonly used. SQL is a data sublanguage used in querying, updating, and managing relational databases. A data sublanguage is one that may be used in association with another computer language for the specialized purpose of accessing data. Examples of languages which SQL can be associated with include COBOL, Fortran, and C. In most cases, a computer application has a mixture of requirements. It is usually helpful if the application writer can build portions of the application by using a language well suited for that portion of the application, and reverting to a specialized data language only for those parts of the application that require it. In this way, the data language is often viewed as a data sublanguage with respect to the primary programming language, or host language. Although SQL is not a programming language in the same sense as C or Pascal, SQL can either be used in formulating interactive queries or be embedded in an application as instructions for handling data. The SQL standard also contains components for defining, altering, controlling, and securing data. SQL is designed for both technical and nontechnical users.

There are many relational data sublanguages. Examples of these relational data sublanguages include QUEL from Relational Technology, Inc. (ASK/Ingres), and RDML from Digital Equipment Corporation. However, SQL has been formally standardized for access to relational databases and is widely implemented and used. There are many variations of SQL.

One example of such a variation is RISQL™ from Red Brick Systems.

In the relational database model, the basic unit of data is typically considered the relation. In SQL, the relation is represented by a table, with a primary difference between a relation and a table being that a relation typically does not have duplicate rows while a table can. A relation is typically made up of one or more attributes. These attributes are represented in column form in SQL. Each column has associated with it a data type. A data type is a characteristic of a piece of data, such as a character string, an integer, or a floating point number. Data is typically stored in a table in tuples, referred to in SQL as rows. As a result, a SQL table contains columns identifying the individual data elements, typically by name, and rows representing records of related data.

FIGS. 1A–1D show examples of relational database tables with attributes written in columns and data related to those attributes written in rows. For example, in FIG. 1A, the attributes include product ID, product type, and bar code. FIGS. 1B–1D show similar examples of tables related to sales, time, and results.

Specific operations can be performed on these tables, rows, and on individual data elements. One such operation is selection, which identifies a specific row or rows in a table. Selection is typically done by specifying one or more predicates that are used to filter a table to identify rows for which the predicate is true. Predicates are typically found in the "where" clause of an SQL query. For example, a selection operation could request the selection of product ID equal to 1. In the example shown in FIG. 1, this selection would select the first row of FIG. 1A with product ID "1".

Another operation in the relational database model is called the join. A join operation is a way of combining data from two tables which is typically based on the relationships between the data in those tables. For example, the result in FIG. 1D is an example of join operations between the "product" table of FIG. 1A, the "sales" table of FIG. 1B, and the "time" table of FIG. 1C. The product table of FIG. 1A identifies the product type by product ID, while the sales table identifies amount in dollars related to the product ID and a time key. The product table and the sales table are joined based on the product ID column. The sales table also associates a time key with each row, while the time table identifies a day with each time key. Accordingly, the sales table and the time table are joined based on the values of the time key. Note that the result in FIG. 1D is only a subset of possible result columns. Only an example of columns which have been selected is shown in FIG. 1D.

FIG. 2 shows relationships between a fact table and its dimension tables. Fact tables and dimension tables are a subset of base tables. Base tables are database tables, while fact tables are base tables which record events, such as a sales event. A sales event may include information related to a time, a store, and a product. The tables from which this related information is stored are the fact table's dimension tables. For example, a time table, a store table, and a product table are the sales table's dimension tables.

In the example shown in FIG. 2, the fact table is a sales table and the dimension tables are a time table, a product table, and a store table. For instance, the sales fact table may include the total sales at a particular store, on a particular date, within a particular time frame, of a particular product. Placing repeated information in a separate table is a type of normalization.

Normalization eliminates redundancy. This class table in FIG. 2 is a result of normalization, and eliminates redundancy in the product table.

Another concept in relational database models is functional dependency. A functional dependency is a many-to-one relationship between columns of values in database tables. A functional dependency from column x to column y is a constraint that requires two rows to have the same value for the y column if they have the same value for the x column. A functional dependency may be explicitly declared by a user, such as the database administrator.

Further, relational database models provide for an aggregation query, which is a query that requires the summarization or consolidation of rows in database tables, typically using a set function, such as SUM or COUNT, and an optional GROUP BY clause. An aggregate table is typically a table that summarizes or consolidates detail level records from other database tables.

SQL also provides the ability to define a virtual table and save that definition in a database as metadata, with a user-defined name. The object formed by this operation is called a view. A view is an example of a virtual table. It is generally not physically materialized anywhere until it is needed, for instance when a SQL statement references it. The metadata about the view can include information such as the name of the view, the names and data types of each column and the SQL text describing the data the view produces. The metadata about the view is typically stored in the database's metadata, but the actual data that the user will see in the view are typically not physically stored. Rather the data are typically stored in base tables from which the view's rows are derived. In the case of a materialized view, data is typically stored in an associated table. In general, operations can be performed against views just as they can be performed against base tables.

By using a sublanguage, such as SQL, a user can request information such as how many units of cereal X were sold on Jan. 1, 1998. The result to that query can be derived from the product table shown in FIG. 1A, the sales table shown in FIG. 1B, and the time table shown in FIG. 1C. However, deriving the answers to each question from various tables can be highly inefficient and time consuming. In order to increase efficiency, a database administrator can predict questions which are most likely to be asked and precompute a table which includes the answers to these likely questions prior to these questions actually being asked. For example, a store's database administrator may determine that a frequently asked question is the total sum of sales of a given product over a period of one day. Accordingly, the database administrator can create a "materialized view" which is associated with a precomputed table, such as the result table shown in FIG. 1D.

However, a database administrator typically can not be expected to anticipate all common questions likely to be asked and even if all queries were known it is not feasible to precompute/materialize all results. When a query is asked and the answer is not directly available from a precomputed table, then conventionally, the answer to such a query typically needs to be derived from a combination of the base tables. The derivation from base tables can be highly time consuming and can require a substantial amount of processing resources.

What is needed is a system and method for quickly and efficiently deriving an answer to a relational database query using materialized views where the materialized view definition may or may not exactly match the query. The present invention addressed such a need.

For further background information regarding relational databases and SQL, see *Understanding the New SQL: A Complete Guide*, Jim Melton and Alan R. Simon, Morgan Kaufmann Publishers, San Francisco, Calif., 1993.

SUMMARY OF THE INVENTION

A system and method for answering a relational database query is presented. According to an embodiment of the present invention, a database query is received. It is then determined whether that query can be rewritten in such a manner as to be able to utilize a materialized view, herein referred to as a precomputed view, such that an answer to the rewritten query is equivalent to an answer to the original query. If the query can be rewritten, it is determined whether the rewritten query can more efficiently derive the answer than the original query. The query which has the most efficiently derived answer is the query which is utilized to derive that answer.

According to an embodiment of the present invention, in rewriting the original query, predetermined hierarchies of data can be utilized. These predetermined hierarchies are treated as functional dependencies. These predetermined hierarchies allow the deliverance of multi-dimensional database (MDDB) functionality, such as rollups from aggregates on points in a dimension to other points of coarser granularity in the same dimension.

A method according to an embodiment of the present invention for answering a database query is presented. The method comprising steps of providing a database query; determining if the query should be rewritten; and rewriting the database query by utilizing a predetermined hierarchy of data, the rewriting being performed if it is determined that the query should be rewritten.

In another aspect of the invention, a system according to an embodiment of the present invention for answering a database query is also presented. The system comprises a means for providing a database query; a means for determining if the query should be rewritten; and a means for rewriting the database query by utilizing a predetermined hierarchy of data. The rewriting of the database query is performed if it is determined that the query should be rewritten.

BRIEF DESCRIPTION OF THE DRAWINGS

FIGS. 1A–1D illustrate examples of tables which can be utilized in accordance with SQL.

FIGS. 5–5C are tables illustrating an example of a method according to an embodiment of the present invention for answering a database query.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 2:
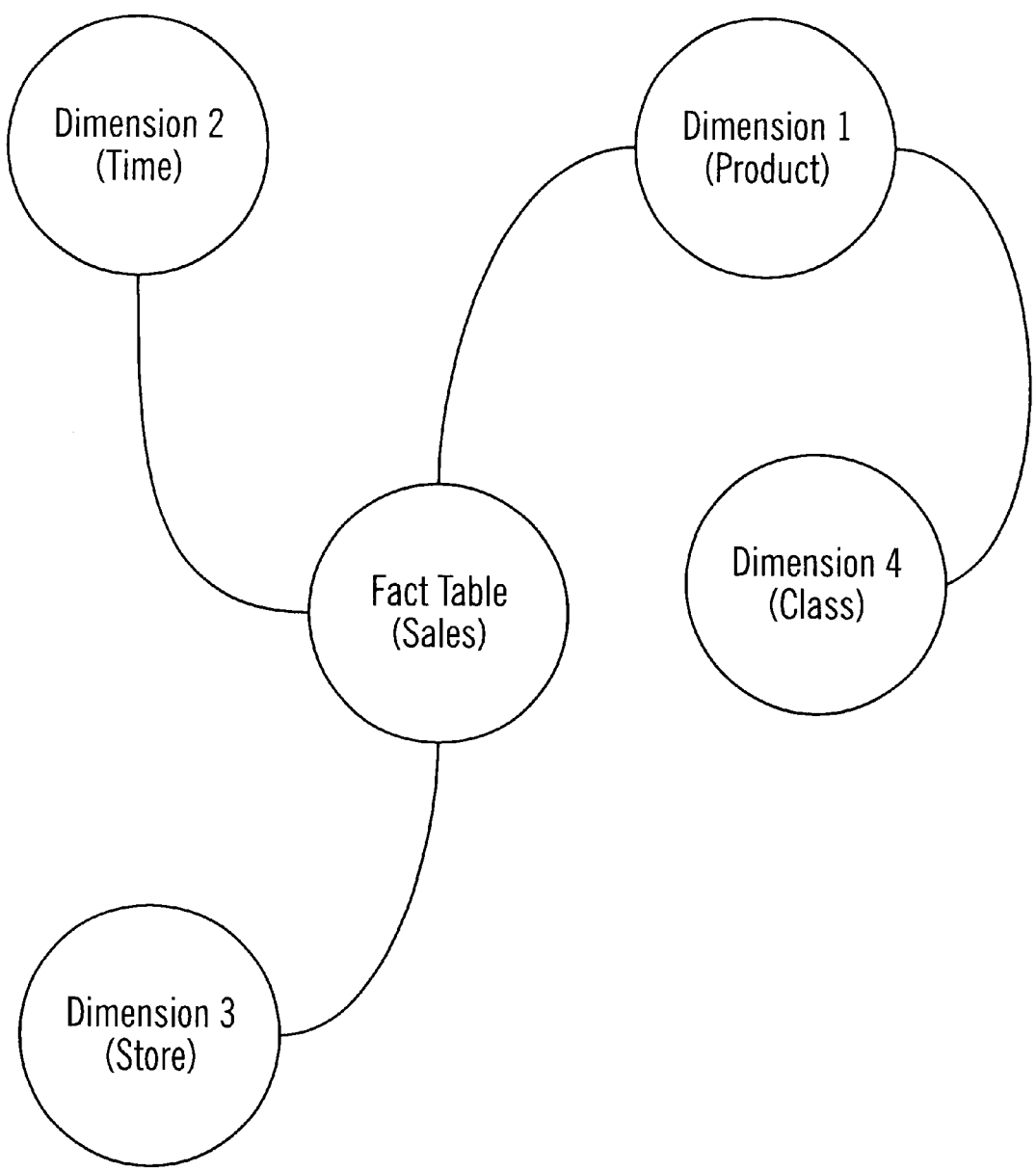
FIG. 2 is an illustration of examples of relationships between a fact table and its dimension tables.
Figure 3:
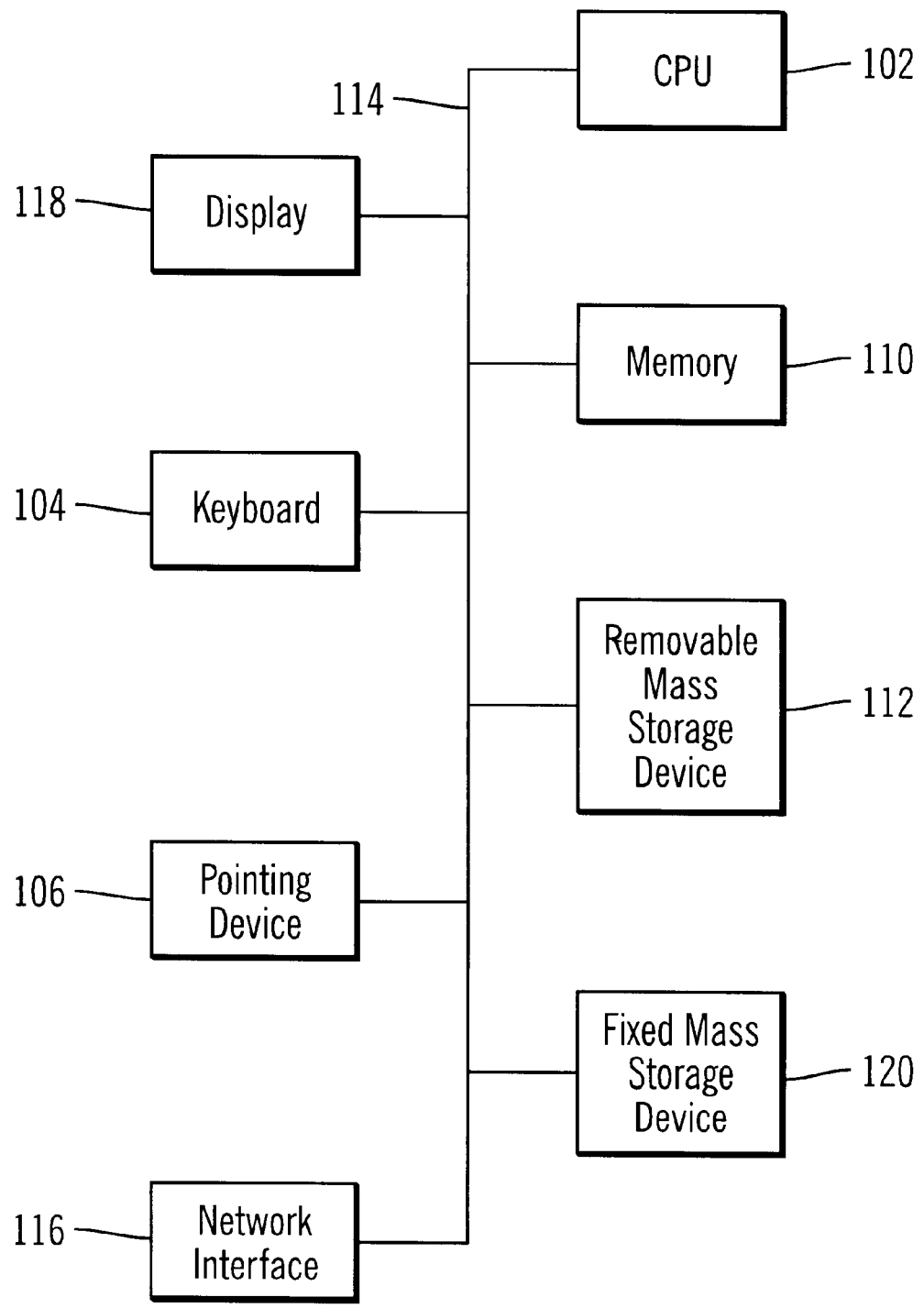
FIG. 3 is a computer system suitable for implementing an embodiment of the present invention.

FIG. 3 is a block diagram of a general purpose computer system 100 suitable for carrying out the processing in accordance with one embodiment of the present invention. FIG. 3 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage is a hard disk drive. Mass storage 112, 120 generally store additional programming instructions, data, and the like that typically are not in active use by the CPU 102. It will be appreciated that the information retained within mass, storage 112, 120 may be incorporated, if needed, in standard fashion as part of primary storage 110 (e.g. RAM) as virtual memory.

In addition to providing CPU 102 access to storage subsystems, bus 114 can be used to provide access to other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 114 is illustrative of any interconnection scheme serving to link the subsystems. The computer system shown in FIG. 3 is but an example of a computer system suitable for use with the invention. Other computer architectures having different configurations of subsystems may also be utilized.

Figure 4:
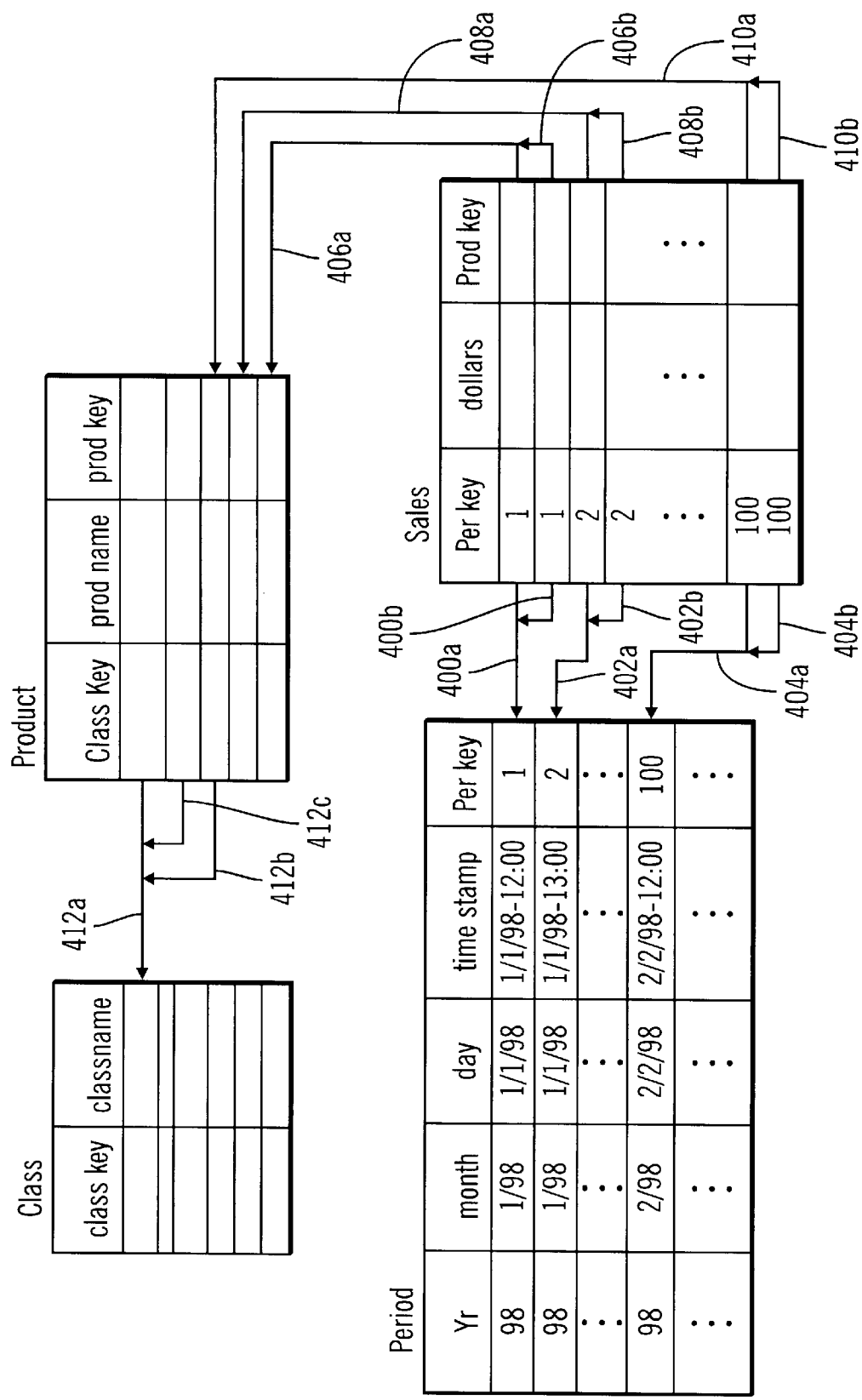
FIG. 4 is an illustration of an example of various tables which can relate and access data from other tables.

FIGS. 4–5C illustrate an example of a system and method of an embodiment of the present invention for answering a database query. FIG. 4 shows four database tables: class, product, period, and sales.

The tables shown in FIG. 4 include foreign key-primary key relationships. A primary key uniquely identifies each row in a database table. A primary key can be one value from a single column or a combination of values from multiple columns. A foreign key column contains only the values of a primary key column of another table and establishes a many-to-one relationship between two tables. Unlike a primary key column a foreign key column can contain duplicate values. In the example shown in FIG. 4, primary keys include class.classkey, product.prod-key, and period.perkey. The notation "tablename.columnname" indicates the name of the table which is stated prior to "." and the column name which is stated after the ".". For example, "class.class_name" refers to the column "class_name" in the class table. The foreign keys in this example are product.class_key, sales.prod_key, and sales.per_key. These foreign keys are shown to be referring to the corresponding primary keys.

Elements in the sales.per_key are shown to refer to the primary keys in period.per_key, as shown by arrows 400A–404B. Arrows 400A and 400B show a many to one relationship between two elements of sales.per_key to a single element in period.per_key. Likewise, the foreign key, sales.prod_key, is shown to have a many to one relationship with its corresponding primary key, product.prod_key, as shown by arrows 406A–410B. The foreign key, product.class_key, is also shown to have a relationship with its corresponding primary key, class.classkey, as can be seen by arrows 412A–412C.

A foreign key-primary key relationship can be utilized by equating the foreign key-primary key columns. For example, the foreign key-primary key relationship between the sales table and the period table can be expressed by "sales.per_key=period.per_key."

In the example shown in FIG. 4, assume that there is a materialized view, herein referred to as a precomputed view, which has already been created. A precomputed view is a view that is linked to a database table known as a precomputed table. The view defines a query, and the table contains the precomputed results of the query. As previously mentioned, users, such as a database administrator (DBA), can determine which questions are most likely to be asked and create a precomputed view in anticipation of that question. Assume that in this example, a precomputed view is defined by the following:

select prod_name, day, sum (dollars)
    from sales, product, period
    where sales.per_key=period.per_key and
        sales.prod_key=product.prod_key
    group by prod_name, day;

Although the examples herein are represented in SQL, any appropriate sublanguage can be utilized to implement the system and method according to the present invention. Examples of these other sublanguages including any variation of SQL, such as a SQL extended for an object-relational DBMS.

The query in this example is considered an aggregation query, which is a query that requires the summarization or consolidation of rows in database tables, typically using a set function, such as SUM or COUNT, and a GROUP BY clause. An aggregate table is typically a table that summarizes or consolidates detail level records from other database tables. An aggregate table is herein meant to include a precomputed table that stores the results of an aggregate query defined in an associated precomputed view. The associated precomputed view can also be referred as an aggregate view.

The query in the precomputed view can be classified into several clauses: "select", "from", "where", and "group by." In the "select" clause, the query requests a selection of rows under the "prod_name" column, the "day" column and a sum of values in the "dollars" column. In the "from" clause, the query indicates which tables the elements of the select clause are to be selected from. Accordingly, the "prod_name" column, the "day" column, and the "dollars" column can be found in the sales table, the product table, and the period table. In the "where" clause, the query utilizes foreign key-primary key relationships, for example, "sales.per_key=period.per_key". In the "group by" clause, the query identifies columns, wherein common elements of these columns are to be combined. For example, the precomputed table of this example would have the elements of the "prod_name" column and elements of the "day" column combined such that only unique combinations of prod_name and day elements would remain. The result would be a precomputed table with a sum of dollars per_day per_product.

Assume also that a user query is received:
    select class_name, sum(dollars)
    from sales, product, class
    where sales.prod_key=product.prod_key and
        product.class_key=class.class_key
        group by class_name;

According to an embodiment of the present invention, it can be determined whether the precomputed view in our example can be used to rewrite the user query. For this example, assume that a hierarchy has been declared between product name and class_name. Accordingly to an embodiment of the present invention, a declared hierarchy will be treated as a functional dependency. Accordingly, the answer is yes. As can be seen in FIG. 4, prod_name of the product table can be used to derive class_name of the class table. The class_key column is a foreign key column which corresponds to the primary key class_key. Accordingly, class_name can be derived from prod_name. Since the precomputed view in this example is group by prod_name and day, and class_name can be derived from prod_name, then the precomputed view can be used to rewrite the user query. Having the column "day" is simply extraneous information in the precomputed view and does not affect the results of rewriting the user query.

A term known as "rollup" indicates the computation of aggregates that are at a courser granularity than existing precomputed aggregates. The previous example exemplifies the concept of a complex rollup. For example, monthly sales totals may be rolled up to quarterly and annual sales totals. This rollup capability relies on explicit functional dependencies provided by a user, and on functional dependencies known implicitly to the query rewrite system through primary key and foreign key relationships. A functional dependency is a many-to-one relationship shared by columns of values in database tables. A functional dependency from column x to column y is a constraint that requires two rows to have the same value for the y column if they have the same value for the x column. A functional dependency may be explicitly declared by a user, such as the database administrator.

In this example, there is a rollup path from prod_name to class_name (assuming the user/data base administrator had declared a functional dependency). The precomputed view can be used to rewrite the query, although further summing would be required.

FIGS. 5A–5c show examples of tables which further illustrate an embodiment of the present invention. In this example, assume that a precomputed view is as follows:

select day, sum(dollars)
    from sales, period
    where sales.per_key=period.per_key
    group by day;

The resulting aggregate table is shown in FIG. 5A. Assume the name of the resulting aggregate table is entitled "sum_dollars_by_day." Rows under the day column and rows under the sum column have been selected from the sales table and the period table (both shown in FIG. 4), where the per_key column of the sales table is the foreign key which refers to the per_key column of the period table which is the primary key. The aggregate table shown in FIG. 5A has been grouped by day, that is the rows in the dollar column have been summed according to the day. Accordingly, the aggregate table of FIG. 5A shows the total sum of dollars transacted on a given day.

Suppose a user query is received, such as the following:

select month, sum(dollars)
    sum sales, period
    where sales.per_key=period.per_key
    group by month;

In order to determine whether the precomputed view defining the sum_dollars_by_day table of FIG. 5A can be utilized to rewrite the given user query, it needs to be determined whether month can be derived from day. Suppose in this example, a user has declared a hierarchy (functional dependency) between the day and month columns. In order to rollup day to month, the aggregate table of FIG. 5A can be joined with a derived table shown in FIG. 5B. The derived table can be produced in real time, i.e. "on the fly" or can be precomputed view. A derived table is an aggregate dimension table derived from a detail dimension table. The detailed dimension table, from which the derived table of FIG. 5B is derived, is the period table of FIG. 4. Duplicate day/month pairs from the period table of FIG. 4 have been eliminated to produce the derived table of FIG. 5B.

A query equivalent of the derived table of FIG. 5B would be as follows:

select day, month
    from period
    group by day, month;

Accordingly, the user query can be rewritten by using the precomputed view (the precomputed table being shown in FIG. 5A) in the following manner:

select sub_Ø.month, sum (sum_dollars_by_day.sum_dollars)
    from sum_dollars_by_day, (select day, month
        from period
        group by day, month) as sub_Ø (day, month)
    where sum_dollars_by_day.day=sub_Ø.day
    group by sub_Ø.month;

The "select" clause selects elements of a month column from a table called "sub_Ø", and sums a column called sum_dollars from the table sum_dollars_by_day of FIG. 5A. The "from" clause indicates that the month columns and the sum_dollars column can be found in sum_dollars_by_day table of FIG. 5A. Additionally, the "from" clause also indicates that another table is to be generated and called "sub_Ø" with columns day and month. The creation of the sub_Ø table is via a parenthetical clause within the "from" clause.

The parenthetical clause recites the query which produces the derived table of FIG. 5B:

select day, month
    from period
    group by day, month;

The derived table of FIG. 5B is created and named as sub_Ø in this rewritten query. In the "where" clause, a foreign key/primary key relationship is defined as the foreign key being the day column in the sum_dollars_by_day table referring to the primary key which is the day column of the sub_Ø table. The resulting table is to be grouped by values in the month column of the sub_Ø table.

Note that if day was a primary key of the period table, then no derived table would be needed. A reason for creating the derived table of FIG. 5B is to provide an accurate result. If the sum_dollars_by_day table of FIG. 5A was simply joined with the period table of FIG. 4 under the column day, then the total sum of dollars for each day would be multiplied by the number of times that day appeared in the period table of FIG. 4, rather than having the desired effect of having a single sum of the dollar transactions for a given day. Accordingly, the derived table of FIG. 5B allows the calculation of an accurate result.

The resulting table to the user's query is shown in FIG. 5C. Although the table in FIG. 5C is the result of the user's query, the table in FIG. 5C can be created via the precomputed view given in this example, in the above described manner.

As shown by the examples discussed in relation to FIGS. 4–5C, the method and system according to an embodiment of the present invention can determine if a user query can be rewritten into a rewritten query which takes advantage of precomputed views, utilize predefined hierarchy of data to determine if elements of a finer granularity can be rolled up into coarser granularity, and derive necessary means to accomplish the complex_rollup (for example, by creating a derived table when necessary). By efficiently utilizing precomputed views which have already been created and stored, the method and system according to the present invention can greatly increase efficiency in returning answers to user queries.

Figure 6:
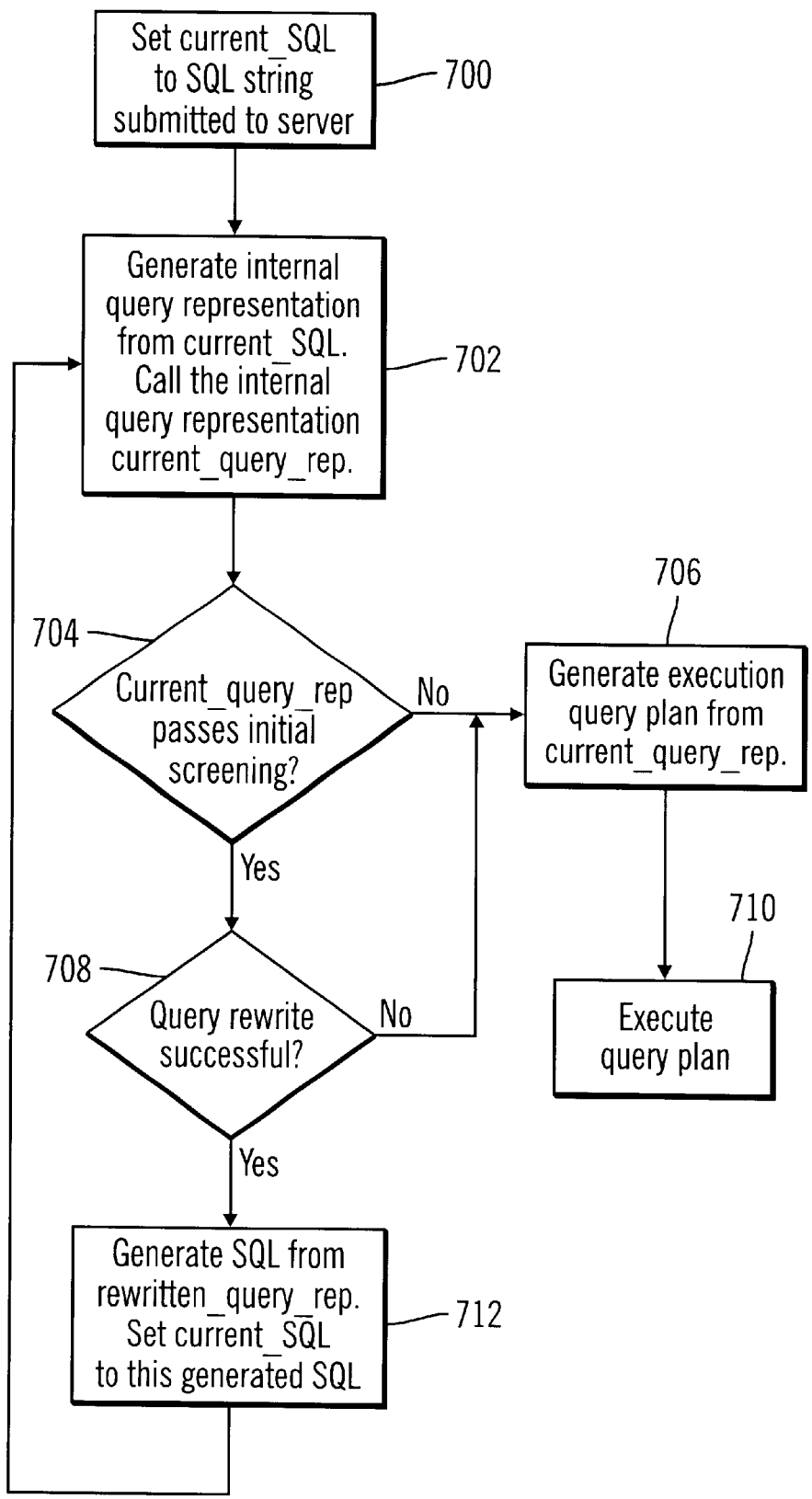
FIGS. 6–19 are flow diagrams of examples of a method according to an embodiment of the present invention for answering a database query.

FIGS. 6–19 are flow diagrams of an example of a method according to an embodiment of the present invention for answering a database query. FIG. 6 is a flow diagram of a high level view of query processing. The result of the flow diagram of FIG. 6 is to return a result table or an error message.

First, Current_SQL is set to a SQL string which has been submitted to a rewrite server via step 700. The SQL string submitted to server is presumably a user query in this example. An internal query representation from current_SQL is generated and the internal query representation is called current_query_rep in this example via step 702. It is then determined whether current_query_rep passes initial screening via step 704. Details of the determination of the initial screening will later be discussed in conjunction with FIG. 7. If current_query_rep does not pass initial screening via step 704, then an execution query plan is generated from current_query_rep via step 706. Accordingly, the submitted query is not rewritten and the initial query is answered using the internal query representation, current_qury_rep.

If current_query_rep passes initial screening via step 704, then it is determined whether a query rewrite of the initial query is successful via step 708. Details of the determination of whether a query rewrite is successful will later be discussed in conjunction with FIG. 8. If the query rewrite is not successful, then an execution query plan is generated from current_query_rep via step 706. If, however, the query rewrite is successful via step 708, then an SQL query is generated from a rewritten query representation, called rewritten_query_rep, and current_SQL is then set to this generated SQL via step 712. Next, step 702 is repeated.

Figure 7:
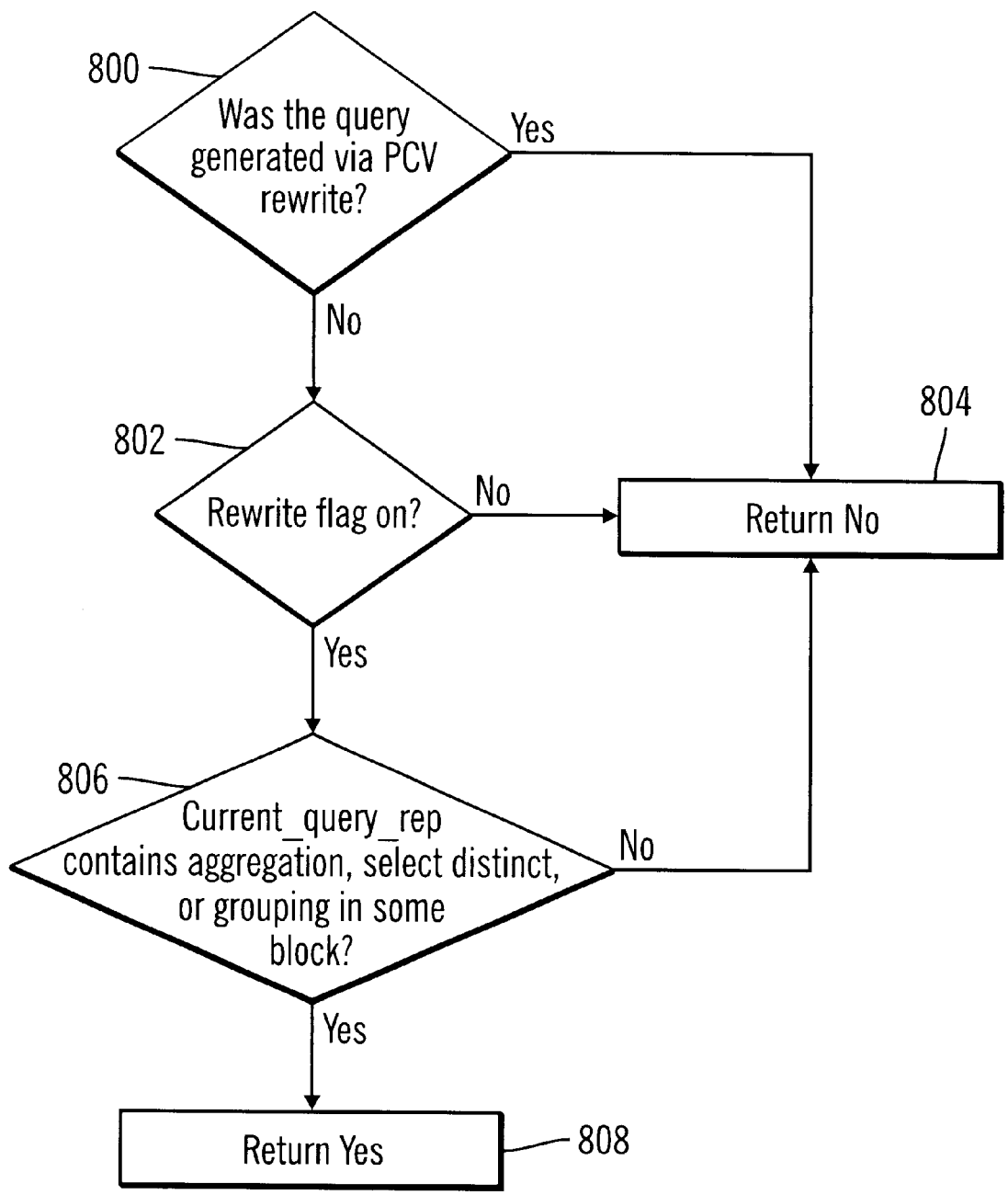

FIG. 7 is a flow diagram of an example of a method according to an embodiment of the present invention for determining whether a query passes initial screening, such as the determination made in step 704 of FIG. 6. The determination of whether a query passes initial screening serves the function of determining if a precomputed view rewrite should be attempted.

It is first determined whether the query was generated via a precomputed view (PCV) rewrite via step 800. If the query was generated via a precomputed view rewrite, then the query does not pass initial screening via step 804. If, however, the query was not generated via a precomputed view rewrite via step 800, then it is determined whether a rewrite flag is on via step 802. When the rewrite flag is on, it indicates a predetermined decision to attempt rewrite. If the rewrite flag is not on, via step 802, then the query does not pass initial screening via step 804.

If, however, the rewrite flag is on via step 802, then it is determined whether the current_query_rep contains aggregation, "select distinct", or grouping in some block, via step 806. A block herein refers to a portion of the query. An aggregate function is a function which summarizes or consolidates rows in a database table, typically using a set function. An aggregate function includes functions such as sum, min, max, count, and average. A distinct function eliminates duplicate values from a specified set of values. Select distinct queries may be converted to select queries with "group by" clauses when possible. Grouping functions operate on a group of values and can also include functions such as sum, min, max, count, and average. These functions are defined in the American National Standards Institute (ANSI) SQL-92 standard.

If current_query_rep does not contain aggregation, distinct, or grouping in some block, then the query does not pass initial screening via step 804. If, however, current_query_rep contains aggregation, distinct, or grouping in some block via step 806, then the query passes initial screening via step 808.

Figure 8:
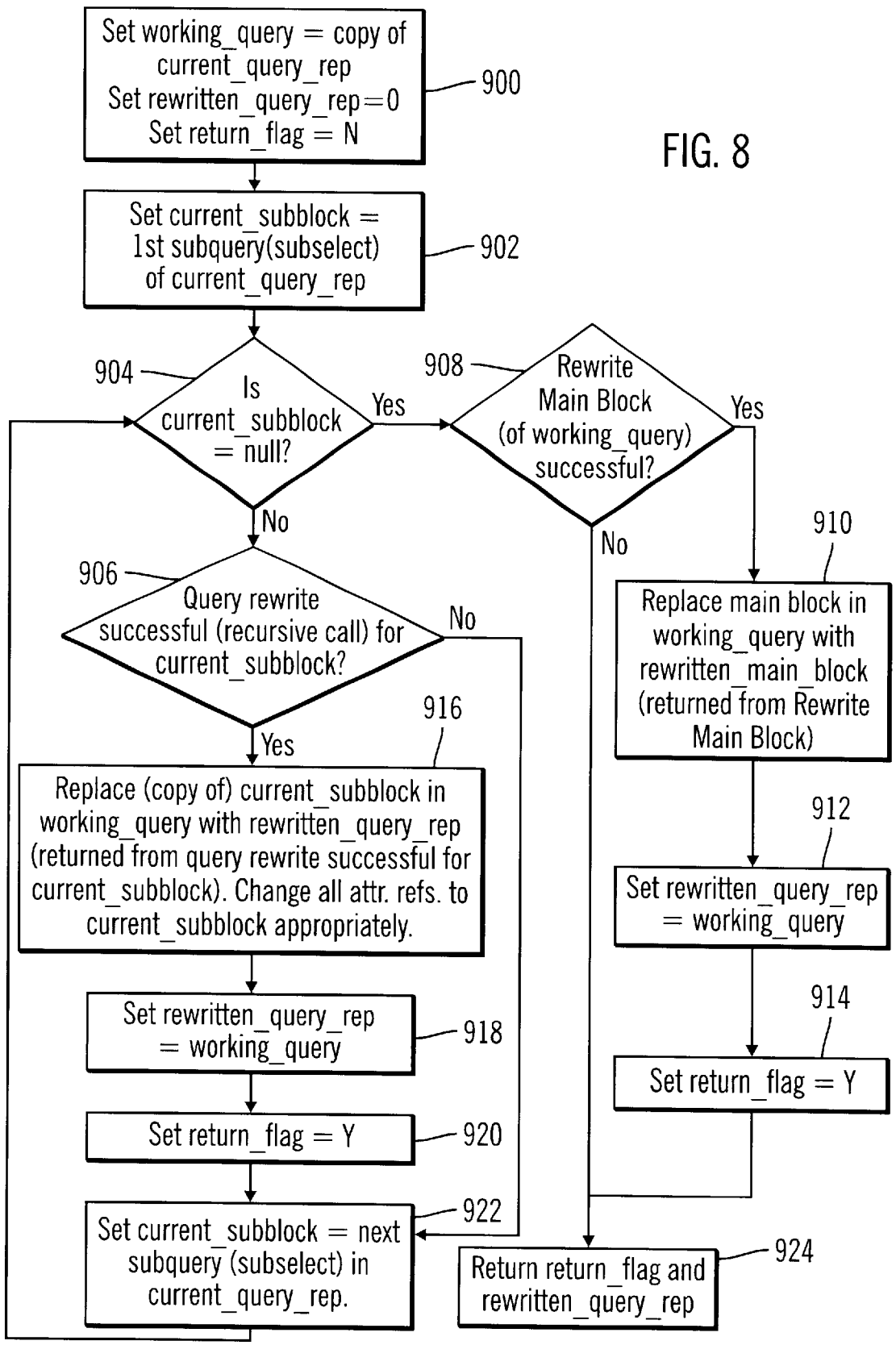

FIG. 8 is a flow diagram of an example of a method according to an embodiment of the present invention for determining whether query rewrite is successful, such as the determination made in step 708 of FIG. 6. This method attempts to rewrite current_query_rep to use some precomputed view. The method attempts to recursively rewrite subqueries. A subquery is a query within a query, sometimes referred to as a subselect. The result is a rewritten query, called rewritten_query_rep in this example, which may possibly be a null value. Additionally, the method results in a yes, or no indicating success or failure of the query rewrite.

First, a variable called working_query is set equal to a copy of current_query_rep; rewritten_query_rep is set equal to Ø (null); and return_flag is set equal to No, via step 900. Additionally, current_subblock is set equal to first subquery (subselect) of current_query_rep, via'step 902.

It is then determined whether current_subblock equals Ø, via step 904. If current_subblock equals Ø, then it would indicate that the user query does not include a subquery. If current_subblock equals Ø, via step 904, then it is determined whether a rewrite of a main block of working_query is successful, via step 908. Details of this determination of the success of rewrite of the main block will later be discussed in conjunction with FIG. 9. If the rewrite of the main block of working_query is not successful via step 908, then return_flag and rewritten_query_rep are returned to the flow diagram of FIG. 6, via step 924. Accordingly, since return_flag may still set equal to No and rewritten_query_rep is still set equal to Ø, the current query is not rewritten and the query rewrite is deemed unsuccessful for the determination of step 708 of FIG. 6.

If, however, the rewriting of the main block of working_query is successful, via step 908, then the main block in working_query is replaced with rewritten_main_block, via step 910. Assume rewritten_main_block is determined from the method of determining whether rewriting the main block is successful is via step 908 (see FIG. 9). Rewritten_query_rep is then set equal to working_query via step 912. The return_flag is set to Yes, via step 914. The return_flag and rewritten_query_rep is then returned to the flow diagram of FIG. 6, via step 924. In this instance the return_flag indicates Yes and rewritten_query_rep includes rewritten_main_block which has been returned from the method of FIG. 9. Accordingly, since the main block of the current query has been rewritten, the determination of whether query rewrite was successful, via step 708 of FIG. 6, is yes.

If current_subblock is not equal to Ø via step 904, then the query currently being analyzed includes a subblock. Accordingly, it is determined whether a query rewrite is successful for current_subblock, via step 906. The query rewrite in the case of a subblock can be a recursive query rewrite call, wherein a rewrite is attempted for every subblock within a subblock. Accordingly, the method shown in FIG. 8 is attempted for every subblock within the query. If the recursive call query rewrite is not successful via step 906, then current_subblock is set equal to next subquery in current_query_rep via step 922. Accordingly, if a first subblock is not a candidate to be rewritten, then the next subquery is analyzed for an attempt to rewrite that subquery.

If, however, the recursive call query rewrite is successful, via step 906, then the current_subblock in working_query is replaced with rewritten_query_sep (returned from query rewrite successful for current_subblock), via step 916. Additionally, all attribute references are changed to current_subblock appropriately via step 916. Attribute references are column references. Since a subblock has been changed, references to columns associated with that subblock may also need to be changed in order to be consistent.

Rewritten_query_rep is then set equal to working_query via step 918. Note that rewritten_query_rep of step 918 is not the same rewritten_query_rep of step 916. The rewritten_query_rep of step 918 is a query representation of the query which contains the subblock which has been rewritten according to the method of FIG. 8. This rewritten subblock is represented by rewritten_query_rep of step 916. The same variable represents various queries or subqueries due to the recursive call of step 906. Accordingly, return_flag is set to yes via step 920.

Current_subblock is then set equal to next subquery (subselect) in current_query_rep, via step 922, and it is then determined whether current_subblock equals Ø, via step 904. At this point, it is determined whether another subquery exists in the current query and the same process occurs for subsequent subqueries.

Figure 9:
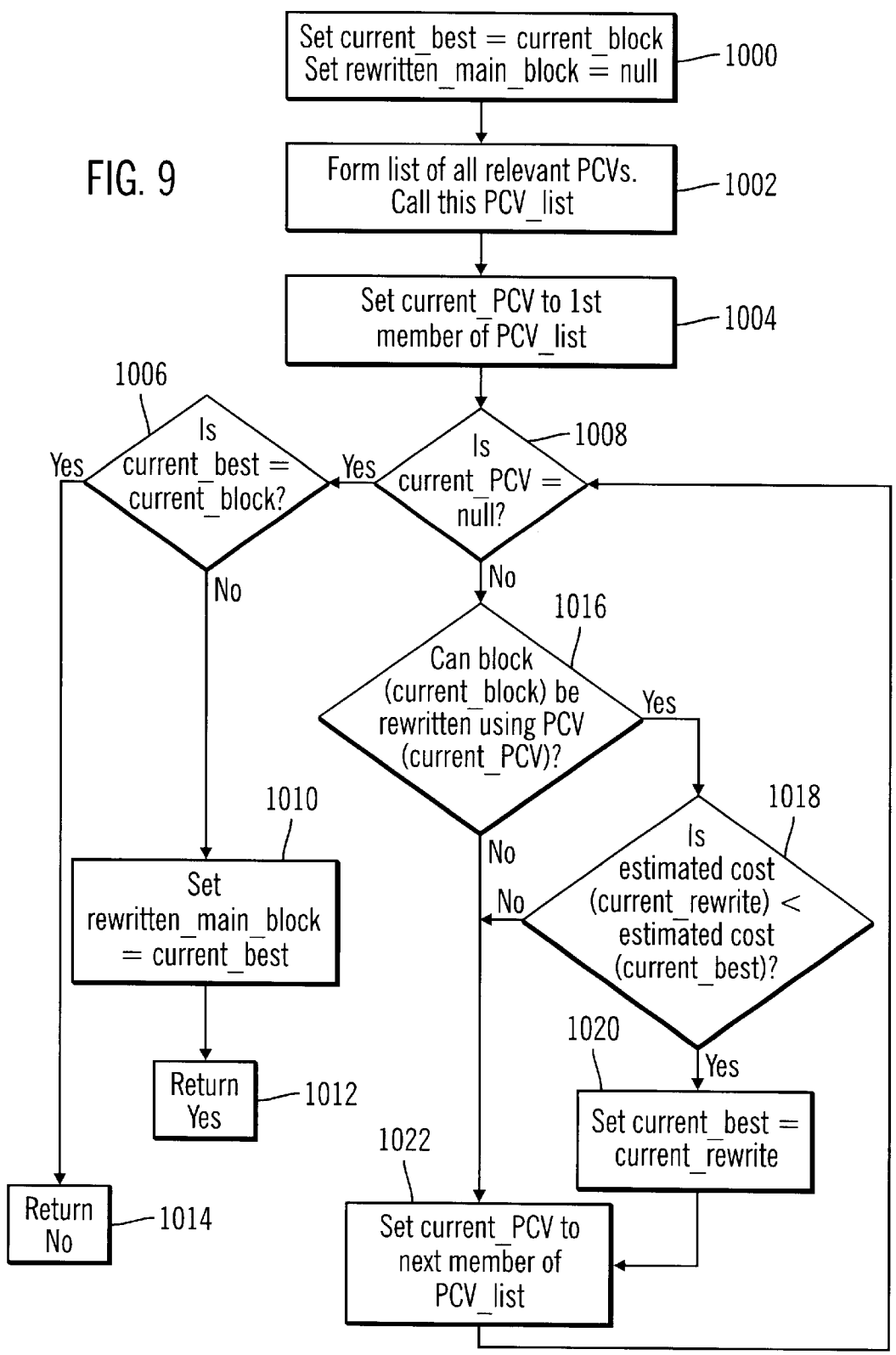

FIG. 9 is a flow diagram of an example of a method according to an embodiment of the present invention for determining whether a rewrite of a main block is successful, such as the determination of step 908 of FIG. 8. The term main block herein refers to the current select—from—where statement. In this diagram, the main block of query is called current_block. The method shown in FIG. 9 attempts to rewrite a main block of a user's query using the "best" available precomputed view. The result of this determination, of whether the rewrite of the main block is successful, is a rewritten main block (rewritten_main_block) which may be a null value, and a Yes or No to indicate success or failure.

Current_best is set equal to current_block; and rewritten_main_block is set equal to Ø, via step 1000. A list of all relevant precomputed views is formed, and this precomputed view is called PCV_list, via step 1002. Details of forming this list of relevant precomputed views will be discussed later in conjunction with FIG. 19. Current_PCV is set equal to first member of PCV_list, via step 1004. It is then determined whether current_PCV is equal to Ø, via step 1008. If current_PCV is not equal to Ø, then it is determined whether current_block can be rewritten using current_PCV, via step 1016. Step 1016 results in a current_rewrite which is initialized at zero or set to rewritten block. Details of whether current_block can be rewritten will later be discussed in conjunction with FIG. 10.

If the block cannot be rewritten using the current PCV, then current_PCV is set to the next member of PCV_list via step 1022, and it is again determined whether the current_PCV is equal to Ø, via step 1008. If, however, current_block can be rewritten using current_PCV, via step 1016, then it is determined whether an estimated cost of current_rewrite is less than an estimated cost of current_best, via step 1018. Cost is estimated by evaluating the number of tables and sizes of these tables which need to be joined together. In evaluating the sizes of tables, the number of rows and width of each row can be considered. Taking these factors into consideration, a system cost for deriving an answer via the current_best can be compared with the system cost for deriving an answer via the current_rewrite.

If the estimated cost of current_rewrite is not less than the estimated cost of current_best, then current_PCV is set to the next member of PCV_list via step 1022. If, however, the estimated cost of current_rewrite is less than the estimated cost of current_best, via step 1018, then current_best is set equal to current_rewrite via step 1020. Then, current_PCV is set to the next member of PCV_list, via step 1022. In summary, the determination of step 1018 determines whether it is more efficient to follow one path in answering the initial query versus another path.

If current_PCV is equal to Ø via step 1008, then it is determined whether current_best equals current_block, via step 1006. If current_best is equal to current_block, then the determination of whether a rewrite of the main block was successful (step 908 of FIG. 8) is No, via step 1014.

If, however, current_best is not equal to current_block, via step 1006, then rewritten_main_block is set equal to current_best, via step 1010, and the determination of step 908 of FIG. 8 is Yes, via step 1012.

Figure 10:
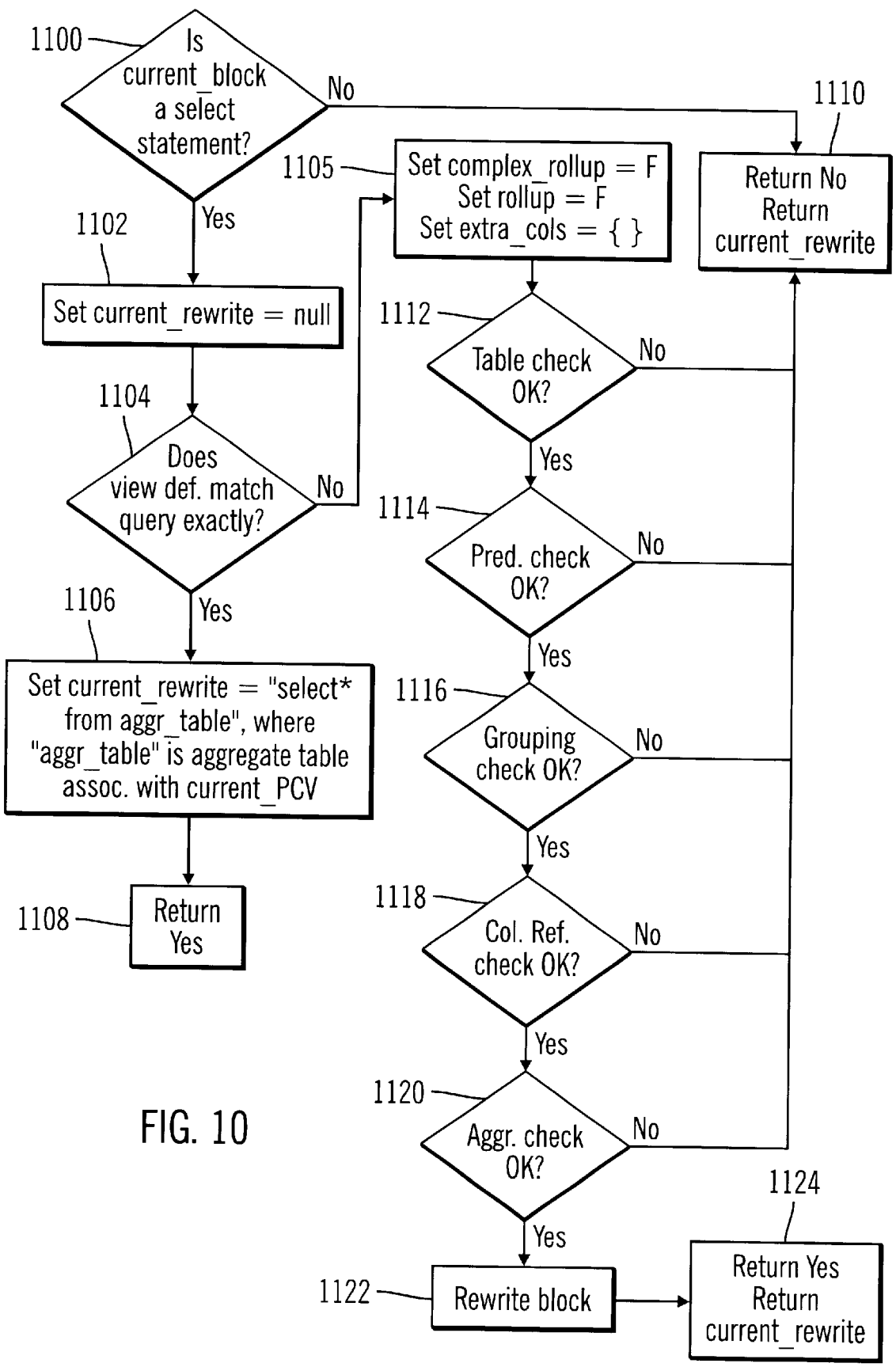

FIG. 10 is a flow diagram of an example of a method according to an embodiment of the present invention for determining whether a block of current_block can be written using a PCV of current_PCV, such as the determination of step 1016 of FIG. 9. The result of this determination is either a new current_rewrite and a Yes, or null set and a No. This method attempts to rewrite current_block using current_PCV if possible.

It is determined whether current_block is a select statement via step 1100. A select statement herein refers to a select_from_where block in a SQL query. If current_block is not a select statement, then the response to the determination of whether the block can be rewritten using a precomputed view is No, and current_rewrite is returned, via step 1110. If, however, current_block is a select statement, via step 1100, then current_rewrite is set to equal to Ø, via step 1102. It is then determined whether a view definition matches the user query exactly, via step 1104. If a view definition is found which matches the query exactly, then current_rewrite is set equal to "select*from aggr_table", where aggr_table is an aggregate table associated with current_PCV, via step 1106. "Select*" herein refers to a select statement which includes all columns from an aggregate table. Accordingly, the response to the determination of whether the block can be rewritten using a PCV is Yes, via step 1108.

If there is no view definition stored which matches the query exactly, via step 1104, then complex_rollup is set equal to False, rollup is also set equal to False, and extra_cols is set equal to { }, via step 1105. It is determined whether a table check is okay, via step 1112. Details of the determination of the table check will be discussed later in conjunction with FIG. 11. If the table check is not okay, then the response to the determination of whether the block can be rewritten using a PCV is No, and current_rewrite is returned, via step 1110. If, the table check is okay, via step 1112, then it is determined whether a predicate check is okay, via step 1114. Details of the predicate check will be discussed later in conjunction with FIG. 12. If the predicate check is not okay, then the block will not be rewritten using a PCV. Accordingly, No and current_rewrite are returned, via step 1110.

If, however, the predicate check is okay, via step 1114, then it is determined whether a grouping check is okay, via step 1116. Details of the grouping check will be discussed later in conjunction with FIGS. 15A–15C. If the grouping check is determined not to be okay, via step 1116, then it is decided not to rewrite the block using a precomputed view, and current_rewrite is returned, via step 1110. If, however, the grouping check is okay, via step 1116, then it is determined whether a column reference check is okay, via step 1118. Details of the column reference check will be discussed later in conjunction with FIG. 16. If the column reference check is not okay via step 1118, then it is determined not to rewrite the block using a precomputed view, via step 1110. If, however, the column reference check is okay, via step 1118, then it is determined whether an aggregate check is okay, via step 1120. Details of the aggregate check will be discussed later in conjunction with FIG. 17. If the aggregate check is not okay, then it is determined not to rewrite the block using a PCV, via step 1110. If, however, the aggregate check is okay, via step 1120, then the block is rewritten, via step 1122. Details of rewriting the block will be discussed later in conjunction with FIGS. 18A–18D. Once the block is rewritten, current_rewrite and yes are returned from the rewrite of the block of step 1122, via step 1124. Accordingly, the rewritten block can now be utilized in accordance with the remainder of the method, shown in FIG. 9, according to an embodiment of the present invention for answering a database query.

Figure 11:
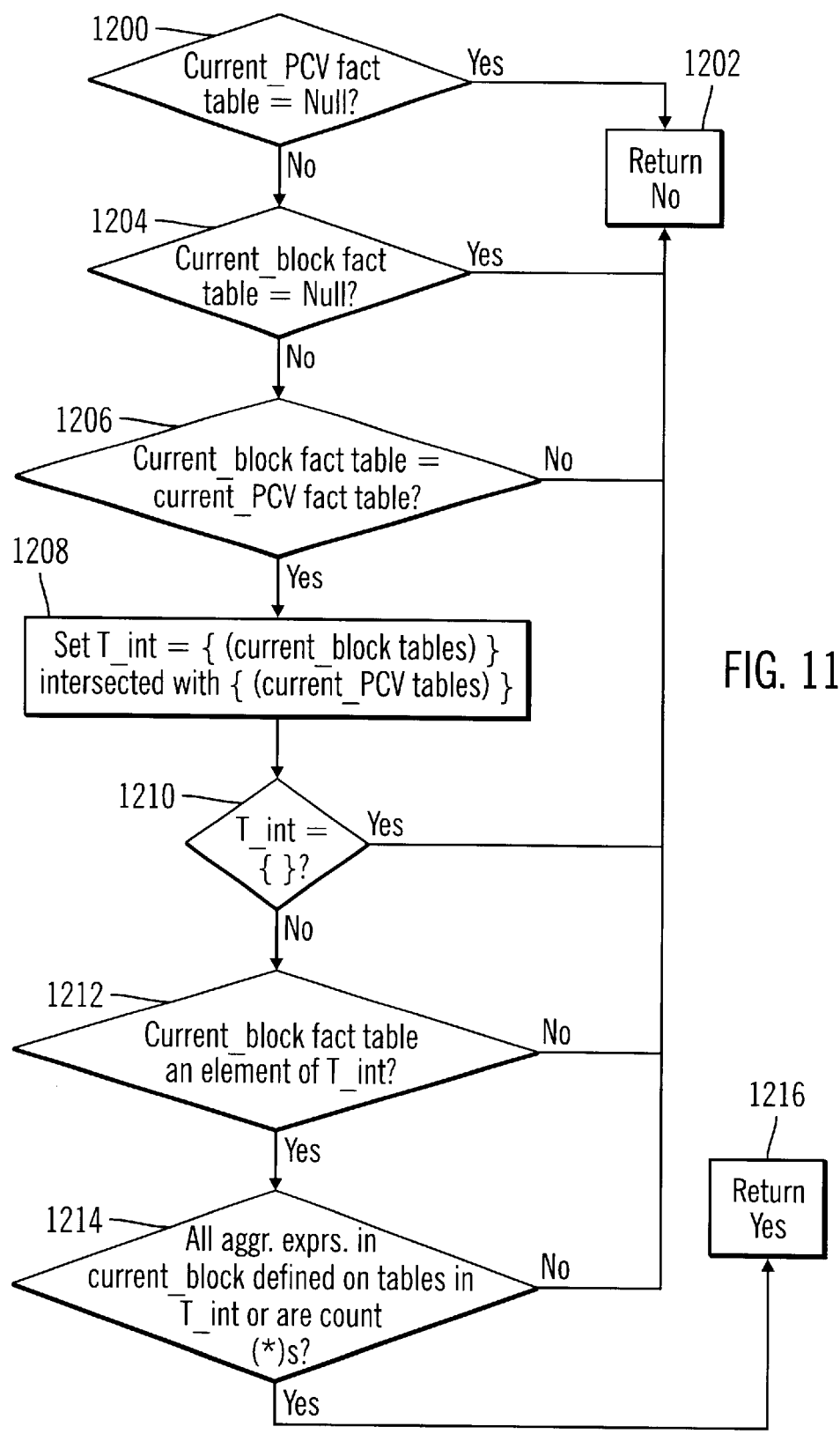

FIG. 11 is a flow diagram of an example of a method according to an embodiment of the present invention for determining whether a table check is okay, such as the check in step 1112 of FIG. 10. FIG. 11 shows an example of a method which checks database tables in a block of query, such as current_block, and a PCV, such as current_PCV.

In this example, it is first determined whether current_PCV fact table equals null, via step 1200. If the current_PCV fact table is null, then the table check is deemed not okay and No is returned, via 1202. If, however, the current_PCV fact table does not equal null, then it is determined whether current_block fact table equals Ø, via step 1204. If there is no current_block fact table, then No is returned, via step 1202. If, current_block fact table does not equal Ø, then it is determined whether current_block fact table equals current_PCV fact table, via step 1206. If current_block fact table does not equal current_PCV fact table, then No is returned, via step 1202.

If, however, current_block fact table does equal current_PCV fact table, via step 1206, then T_int is set equal to the set of (current_block tables) intersected with the set of (current_PCV tables), via step 1208. It is then determined whether T_int equals { }, via step 1210. If there is no element in T_int, then No is returned, via step 1202. If, however, T_int does not equal to Ø, via step 1210, then it is determined whether current_block fact table is a member of T_int, via step 1212. If a fact table is not an element of T_int, then No is returned, via step 1202.

If, however, current_block fact table is an element of T_int, via 1212, then it is determined whether each aggregate expression in current_block is defined on tables in T_int or whether the aggregate expression in current_block is a count(*), via step 1214. "Count(*)s" herein refer to counting all lines in all records in a table or group specified by a group by clause. If the answer to determination of step 1214 is no, then No is returned, via step 1202. If, however, the answer to the determination of step 1214 is yes, then Yes is returned, via step 1216.

Figure 12:
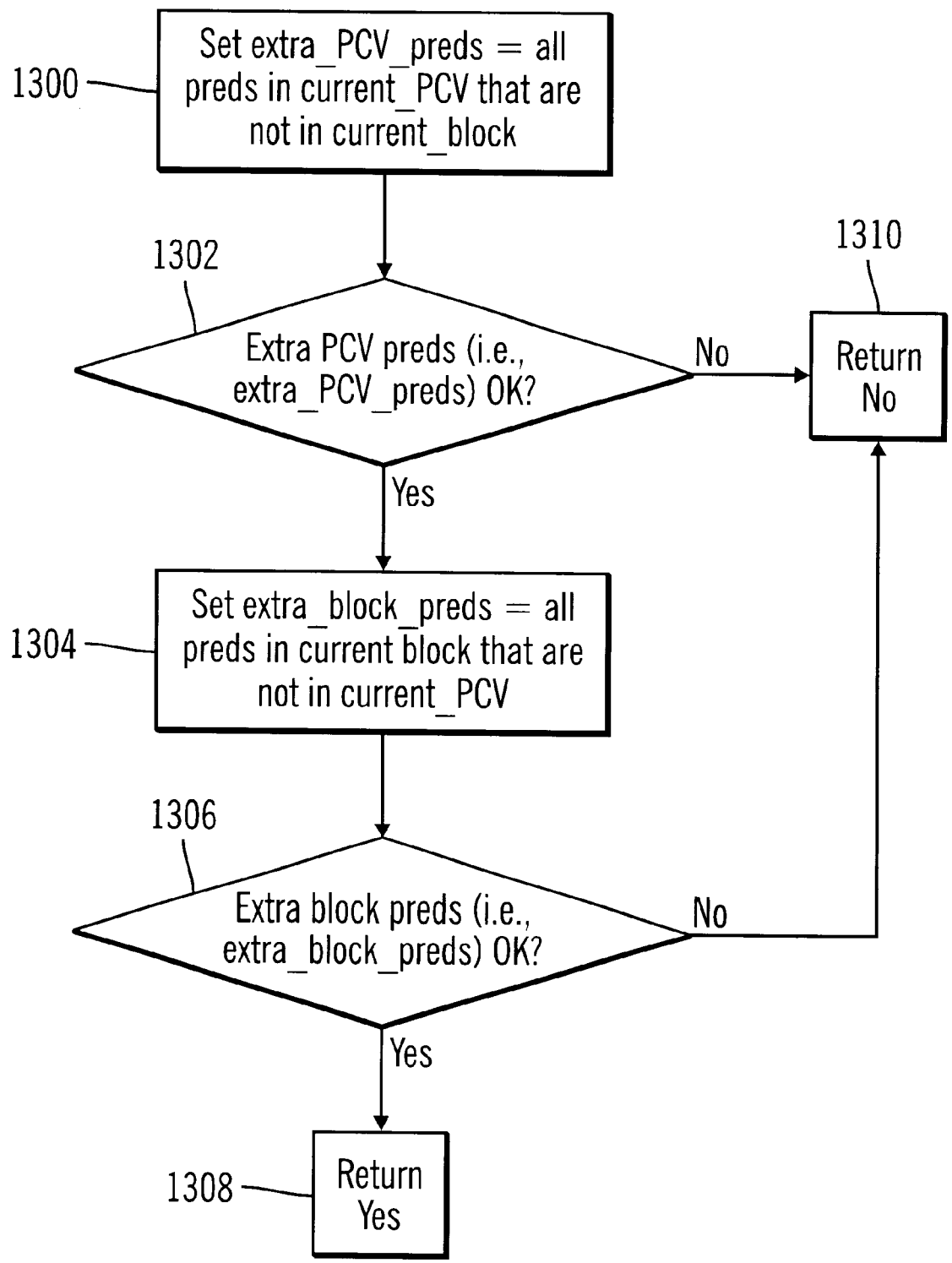

FIG. 12 is a flow diagram of an example of a method according to an embodiment of the present invention for determining whether a predicate check is okay, such as the determination of step 1114 of FIG. 10. This method checks predicates in the current block and current precomputed view. As previously mentioned, selection is typically done by specifying one or more predicates that are used to filter a table to identify rows for which the predicate is true. For example, a selection operation could request the selection of product ID equal to 1, or a predicate could specify, a join condition between tables.

Extra_PCV_preds is set equal to all predicates in current_PCV that are not in current_block, via step 1200. Step 1200 identifies all predicates which are in the PCV but not in the user query. It is then determined whether extra PCV predicates (i.e., extra_PCV_preds) are okay, via step 1302. Details of the determination of whether extra PCV predicates are okay are later discussed in conjunction with FIGS. 13A–13B.

If extra PCV predicates are not okay, via step 1302, then the predicate check fails and No is returned, via step 1310. If, however, extra PCV predicates are okay, via step 1302, then extra_block_preds is set equal to all predicates in current block that are not in current_PCV, via step 1304. It is then determined whether extra block predicates (i.e., extra_block_predicates) are okay, via step 1306. Details of the determination of the of extra block predicates being okay are later discussed in conjunction with FIG. 14. If extra block predicates are not okay, then No is returned, via step 1310. If, however, extra block predicates are okay, via step 1306, then Yes is returned, via step 1308.

Figure 13A:
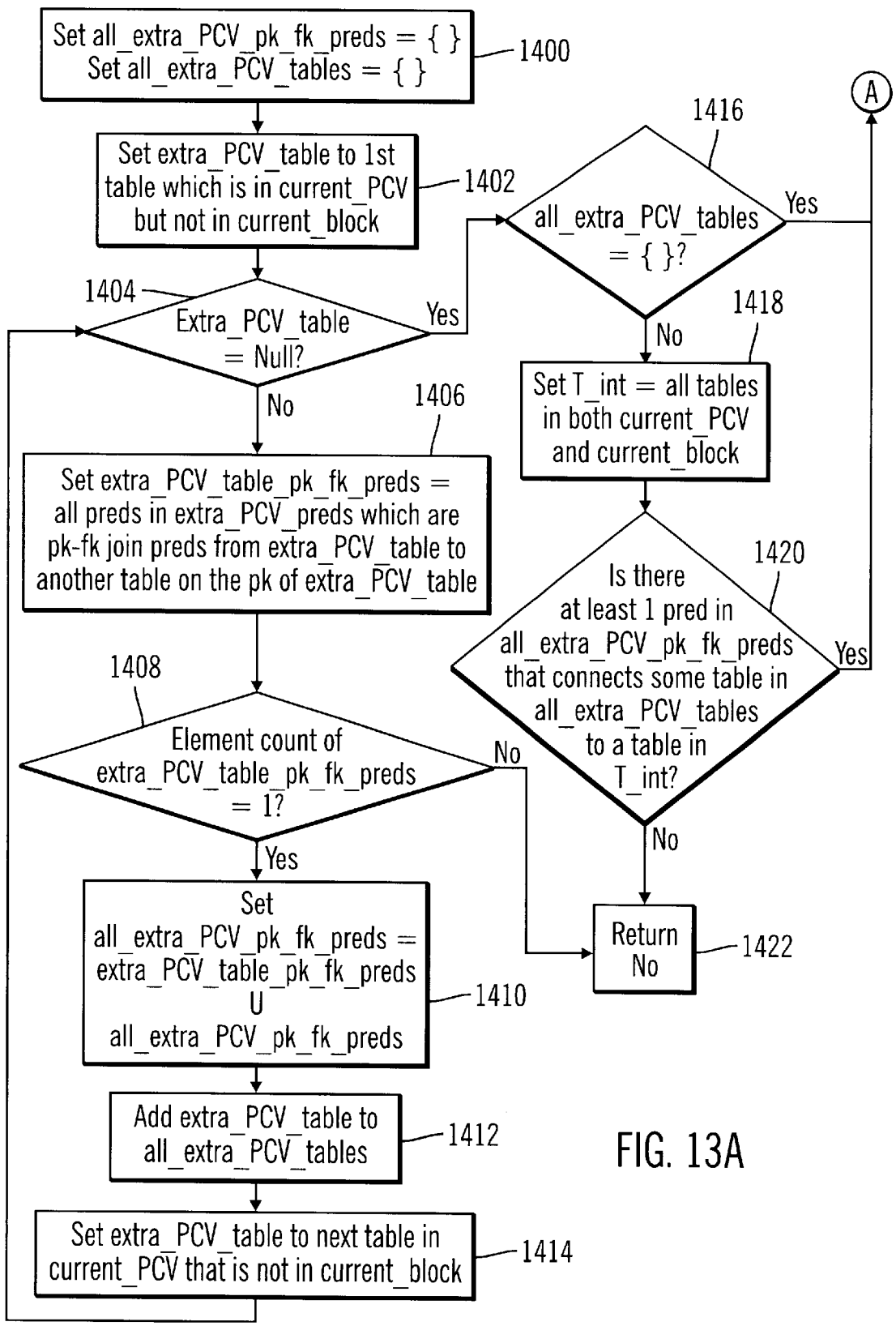
Figure 13B:
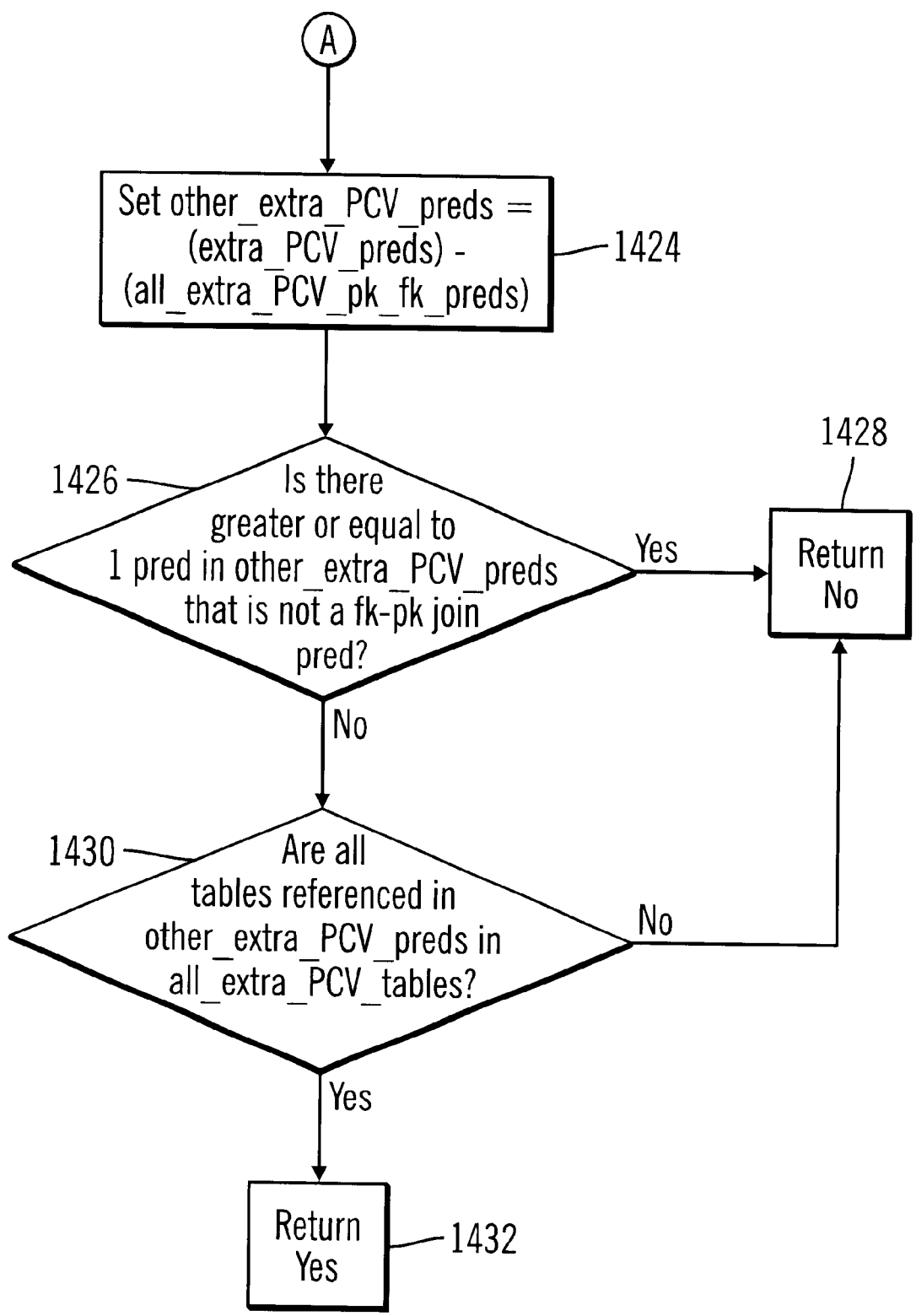

FIGS. 13A–13B are flow diagrams of an example of a method according to an embodiment of the present invention for determining whether extra PCV predicates are okay, such as in step 1302 of FIG. 12.

All_extra_PCV_pk_fk_preds is set equal to { }, and all_extra_PCV_tables is set equal to { }, via step 1400. All_extra_PCV_pk_fk_preds is meant to include PCV predicates with a primary key (pk)/foreign key (fk) relationship which are not in the user query. Likewise, all_extra_PCV_tables is meant to include PCV tables which are not defined in the user query. Extra_PCV_table is then set equal to first table which is in current_PCV but not in current_block, via step 1402. It is then determined whether extra_PCV_table equals Ø, via step 1404. If it equals Ø, then it is determined whether all_extra_PCV tables equals { }, via step 1416. If all_extra PCV_tables is an empty set, then the flow diagram on FIG. 13B is accessed.

If, however, all_extra_PCV_tables is not an empty set, via step 1416, then T_int is set equal to all tables in both current_PCV and current_block, via step 1418. It is then determined whether there is least one predicate in all_extra_PCV_pk_fk_preds that connects some table in all_extra_PCV_tables to a table in T_int, via step 1420. If so, then the flow diagram in FIG. 13B is referenced. If, however, the answer to the determination of step 1420 is no, then No is returned via step 1422. Accordingly, if there is no predicate in the current PCV predicates with a primary key (pk)/foreign key (fk) relationship (which are not in the user query) which connects some table (in the set of PCV tables which are not defined in the user query) to a table in the set of intersected tables (intersection of current PCV tables with current block tables), then the predicate check fails.

If extra_PCV_table does not equal Ø, via step 1404, then extra_PCV_table_pk_fk_preds is set equal to all predicates in extra_PCV_preds which are primary key/foreign key join predicates from extra_PCV_table to another table on the primary key of extra_PCV_table, via step 1406. It is then determined whether an element count of extra_PCV_table_pk_fk_preds equals one, via step 1408. If the element count of extra_PCV_table_pk_fk_preds is not equal to one, then return No, via step 1422. If, however, the element count is one, via step 1408, then all_extra_PCV_pk_fk_preds is set equal to extra_PCV_table_pk_fk_preds unioned with all_extra_PCV_pk_fk_preds, via step 1410. Extra_PCV_table is then added to all_extra_PCV_tables, via step 1412. Extra_PCV_table is then set equal to the next table in current_PCV that is not in current_block, via step 1414. Thereafter, it is determined whether extra_PCV_table is equal to null, via step 1404.

FIG. 13B is a continuation of the flow diagram of FIG. 13A. The flow diagram in FIG. 13B is referenced if all_extra_PCV_table equals an empty set, via step 1416, or if there is at least one predicate in all_extra_PCV_pk_fk_preds that connect some table in all_extra_PV_tables to a table in T_int, via step 1420.

Other_extra_PCV_preds is set equal to extra_PCV_preds minus all_extra_PCV_pk_fk_preds, via step 1424. It is then determined whether there is one or more predicates in other_extra_PCV_preds that is not a foreign key/primary key join predicate, via step 1426. If so, then No is returned, via step 1428. If, however, there is less than one predicate in other_extra_PCV_preds that is not a foreign key-primary key join predicate, via step 1426, then it is determined whether all tables referenced in other_extra_PCV_preds are in all_extra_PCV_tables, via step 1430. If so, Yes is returned, via step 1432, and if not, then No is returned, via step 1428.

Figure 14:
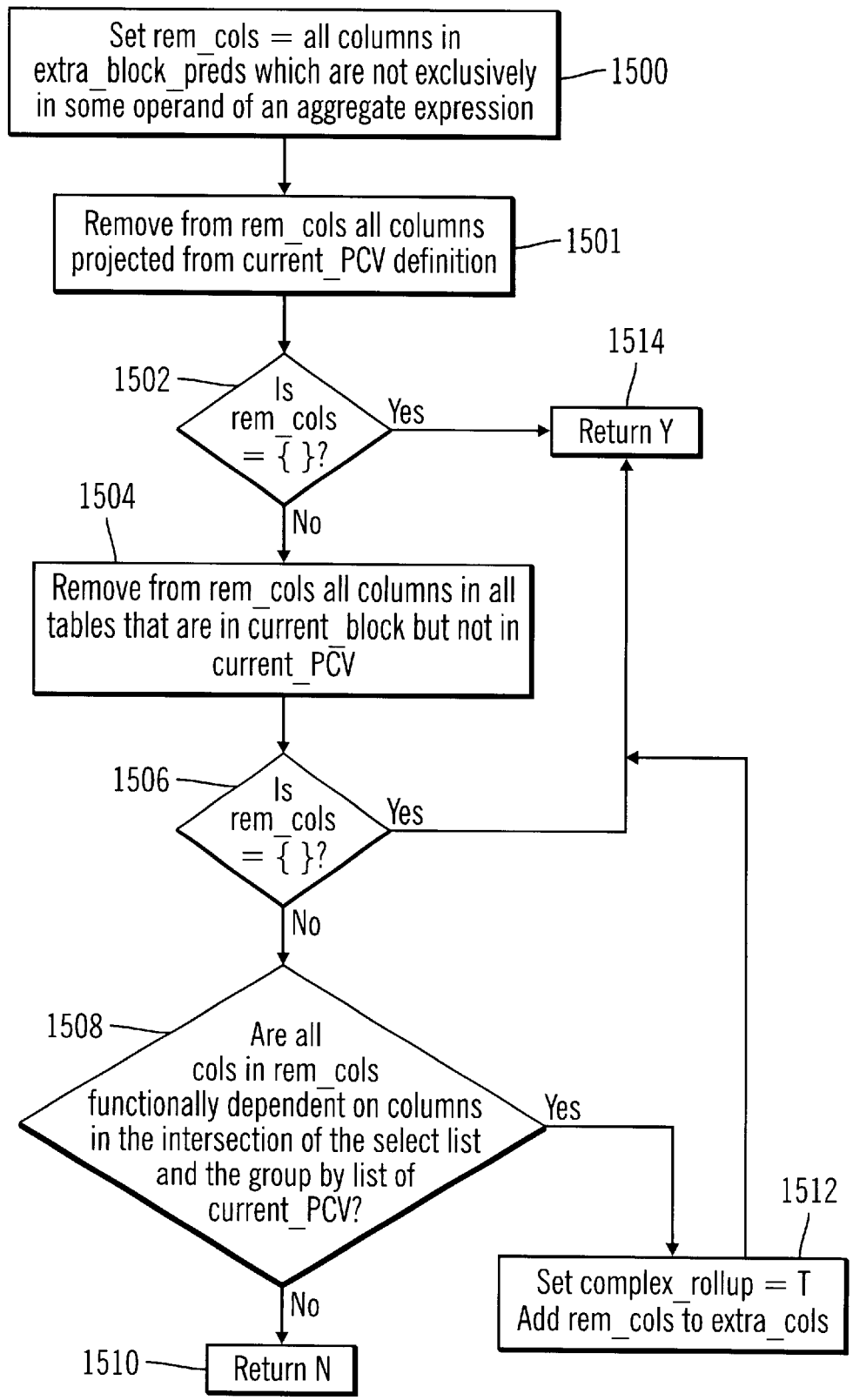

FIG. 14 is a flow diagram determining whether extra block predicates are okay, such as the determination of step 1306 of FIG. 12. Rem_cols is set equal to all columns in extra_block_preds which are not exclusively in some operand of an aggregate expression, via step 1500. All columns projected from current_PCV definition are then removed from rem_cols, via step 1501.

It is then determined whether rem_cols equals { }, via step 1502. If it equals { }, then yes is returned, via step 1514. If, however, rem_cols does not equal { }, via step 1502, then all columns in all tables that are in current_block but not in current_PCV definition are removed from rem_cols, via step 1504. It is then again determined whether rem_cols equals { }, via step 1506. If so, then yes is returned, via step 1514. If not, then it is determined whether all columns in rem_cols are functionally dependent on columns in the intersection of the select list and the group by list of current_PCV, via step 1508. These functional dependencies should be determined using predicates in current_block that are not in current PCV. If all columns in rem_cols are functionally dependent on columns in the intersection of the select list and the group by list of current_PCV, via step 1508, then set complex_rollup equal to T, and rem_cols are added to extra_cols, via step 1512. If, however, all columns in rem_cols are not functionally dependent on columns in the intersection of the select list and the group by list of current_PCV, via step 1508, then no is returned, via step 1510.

Figure 15A:
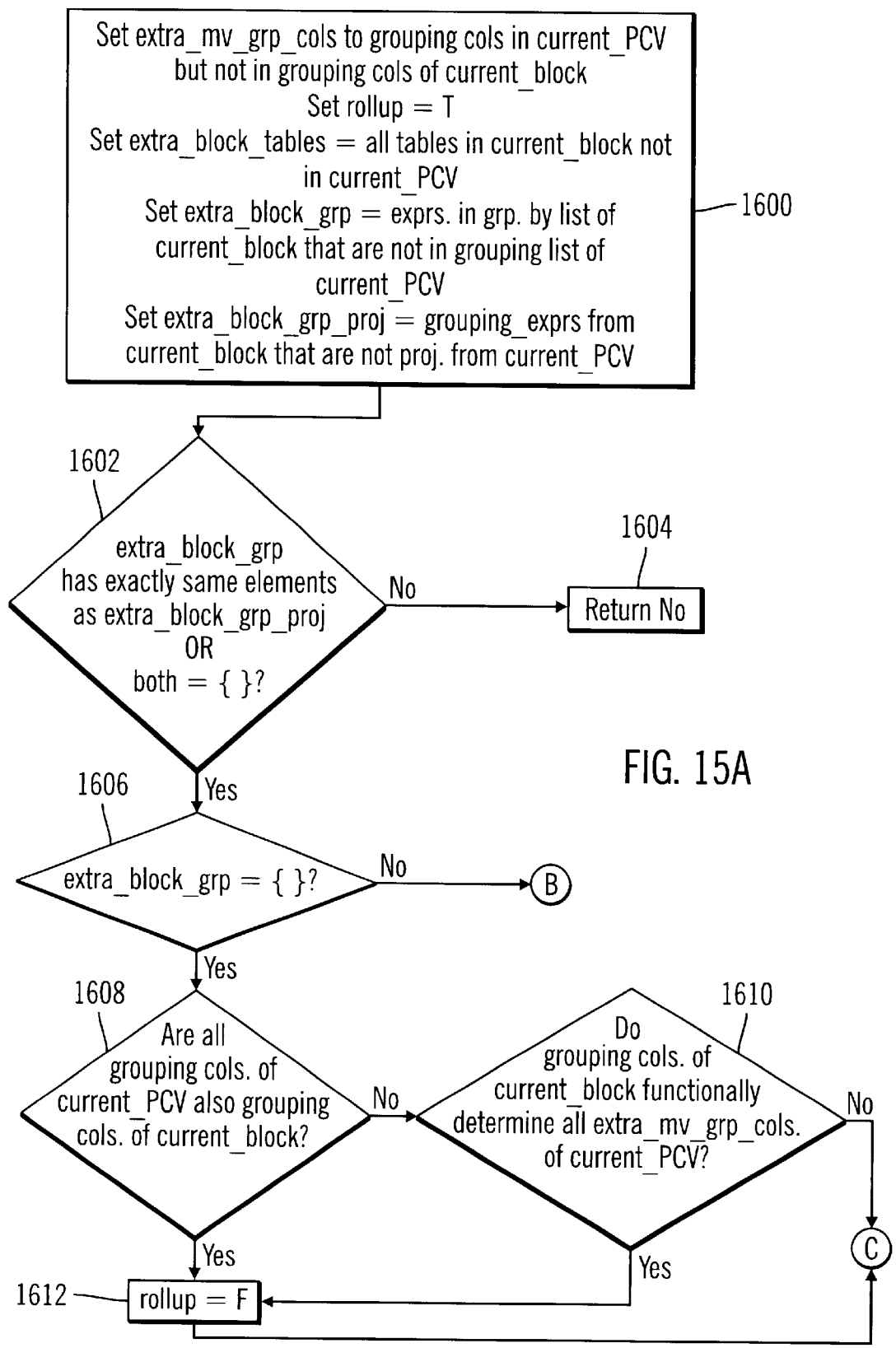
Figure 15B:
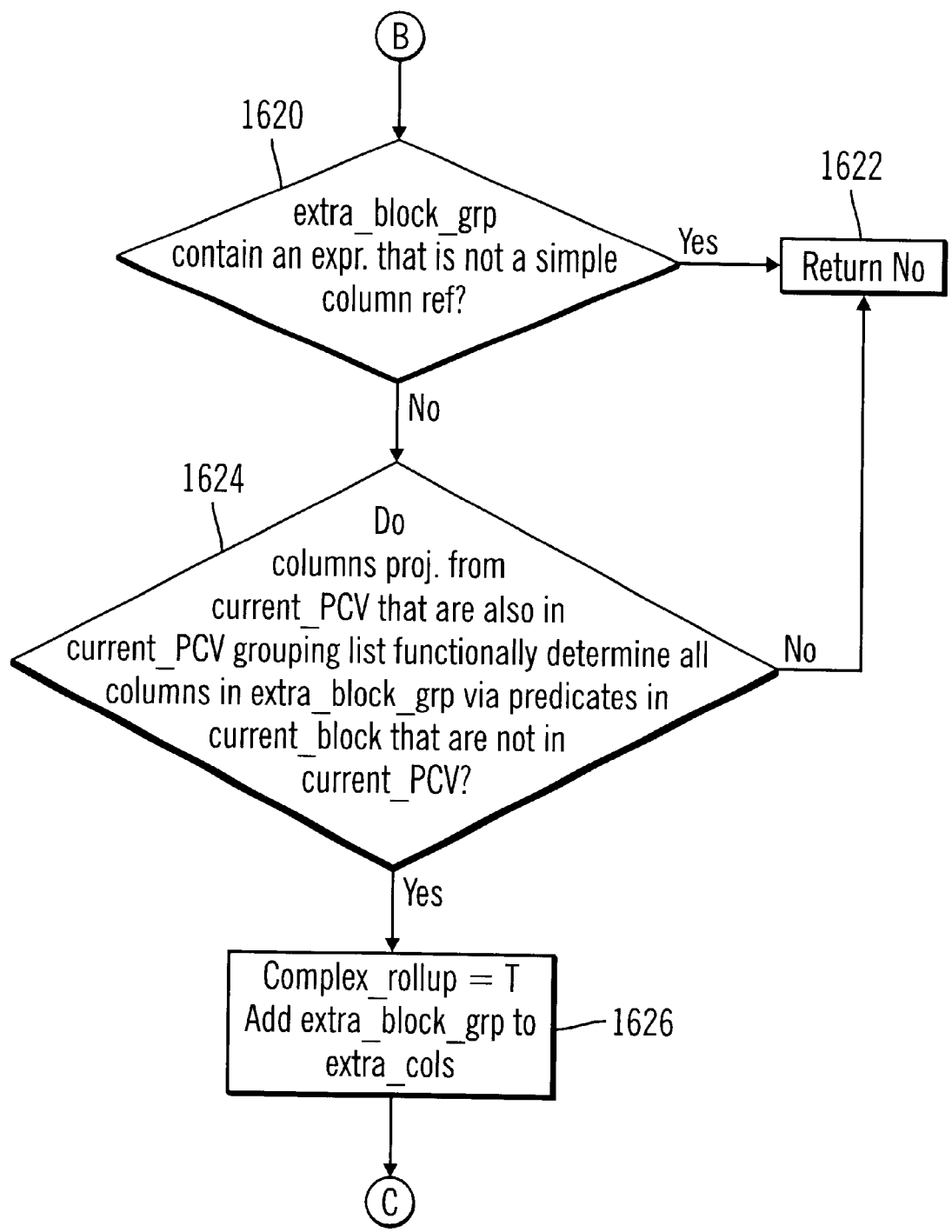
Figure 15C:
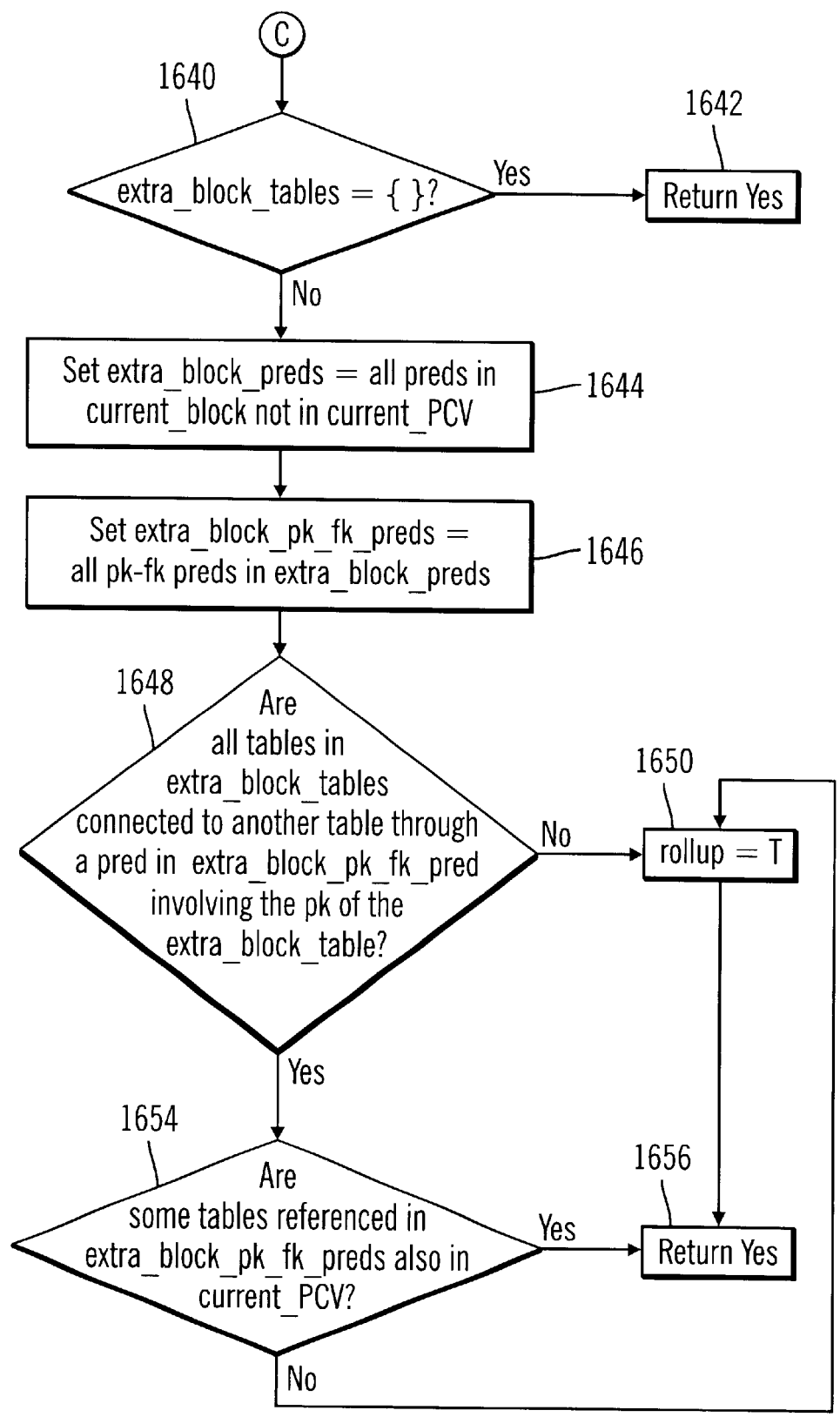

FIGS. 15A–15C are a flow diagram determining whether a grouping check is okay, such as the determination of step 1116 of FIG. 10. Extra_mv_grp_cols is set to grouping columns in current_PCV but not in grouping columns in current_block; rollup is set equal to True; extra_block_table 5 is set equal to all tables in current_block not in current_PCV; extra_block_grp is set equal to expressions in group by list of current_block that are not in grouping list of current_PCV; extra_block_grp_proj is set equal to grouping_exprs.from current_block that are not projected from current_PCV, via step 1600. An expression in a group by list is an expression in a group by clause of a SQL query. The expression can be a simple expression, such as A, or a more complex expression, such as A+B. Rollup and complex_rollup both whether to rollup from data of finer granularity to courser granularity.

It is then determined whether extra_block_grp has exactly the same elements as extra_block_grp_proj, or both extra_block_grp and extra_block_$_{grp}$_proj are equal to an empty set, via step 1602. If either extra_block_grp does not have exactly the same elements as extra_block_grp_proj, or both extra_block_grp and extra_block_grp_proj are not equal to an empty set, then No is returned, via step 1604. If, however, extra_block_grp has exactly the same elements as extra_block_grp_proj, or both are empty sets, via step 1602, then it is determined whether extra_block_grp is an empty set, via step 1606. If it is not an empty set, then the flow diagram of FIG. 15B is referenced. If, however, extra_block_grp is an empty set, via step 1606, then it is determined whether all grouping columns of current_PCV are also grouping columns of current_block, via step 1608. Grouping columns are columns which are identified in a group by clause of an SQL query. If all the grouping columns of current.PVC are also grouping columns of current.block, via step 1608, then rollup is set equal to false, via step 1612. After step 1612, the flow diagram shown on FIG. 15C is then referenced.

If all grouping columns of current_PCV are not grouping columns of current_block, via step 1608, then it is determined whether grouping columns of current_block functionally determine all extra_mv_grp_cols of current_PCV, via step 1610. If these grouping columns do not functionally determine all the extra projection grouping columns of current_PCV, then the flow diagram of FIG. 15C is referenced. If, however, these grouping columns do functionally determine all extra projection grouping columns of current_PCV, via step 1610, then rollup is set equal to false, via step 1612. Thereafter, the flow diagram of FIG. 15C is referenced.

If extra_block_grp does not equal to an empty set, via 1606, then the flow diagram in FIG. 15B is referenced. It is determined whether extra_block_grp contains an expression that is not a simple column reference, via step 1620. A simple column reference is an expression that simply refers to a column, rather than a more complex expression such as A+B.

If it does contain an expression that is not a simple column reference, then No is returned, via step 1622. If, however, extra_block_grp does not contain an expression that is not a simple column reference, via step 1620, then it is determined whether columns projected from current_PCV that are also in current_PCV grouping list functionally determine all columns in extra_block_grp via predicates in current_block that are not in current_PCV, via step 1624. If these projected columns do not functionally determine all columns in extra_block_grp, via step 1624, then No is returned, via step 1622. If, however, these columns do functionally determine all columns in extra_block_grp, via step 1624, then complex_rollup is set equal to true, and extra_block_grp is added to extra_cols, via step 1626. Thereafter, the flow diagram of FIG. 15C is referenced.

The flow diagram of FIG. 15C is referenced after step 1626 of FIG. 15B, step 1610 of FIG. 15A, and step 1612 of FIG. 15A. It is determined whether extra_block_tables equals an empty set, via step 1640. If it is an empty set, then Yes is returned, via step 1642. If, however, it is not an empty set, then extra_block_preds is set equal to all predicates in current_block not in current_PCV, via step 1644. Extra_block_pk_fk_preds is set equal to all primary key/foreign key predicates in extra_block_preds, via step 1646.

It is then determined whether all tables in extra_block_tables are connected to another table through a predicate in extra_block_pk_fk_pred involving the primary key of the extra_block_table, via step 1648. If the determination is No, then rollup is set equal to true, via step 1650. If, however, all tables in extra_block_tables are connected to another table through a predicate in extra_block_pk_fk_pred involving the primary key of the extra_block_table, via step 1648, it is then determined whether some tables referenced in extra_block_pk_fk_preds are also in current_PCV, via step 1654. If the determination is yes, then Yes is returned, via step 1656. If, some of these tables are not also in current_PCV, via step 1654, then rollup is set equal to true, via step 1650, and Yes is returned, via step 1656.

Figure 16:
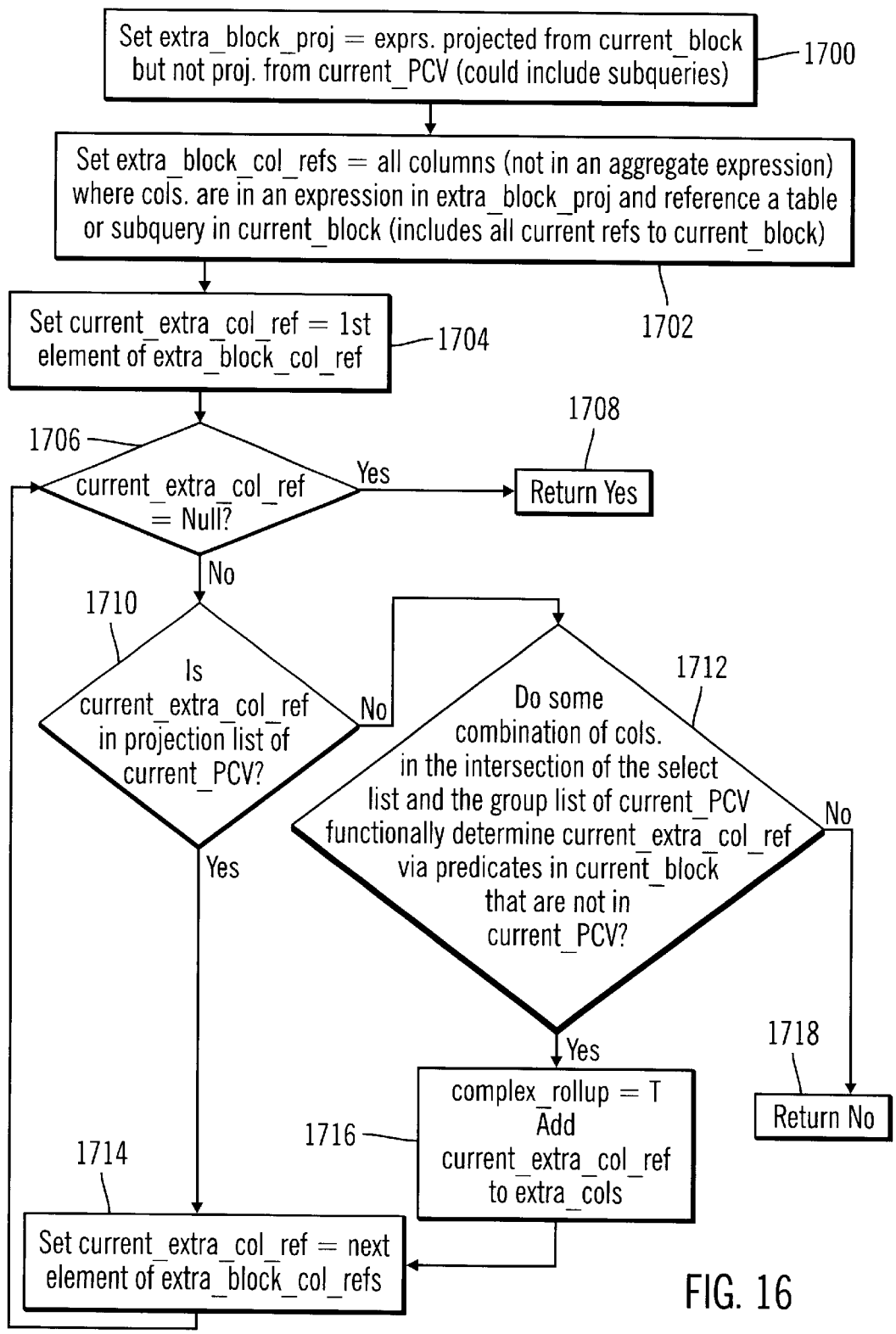
Figure 17:
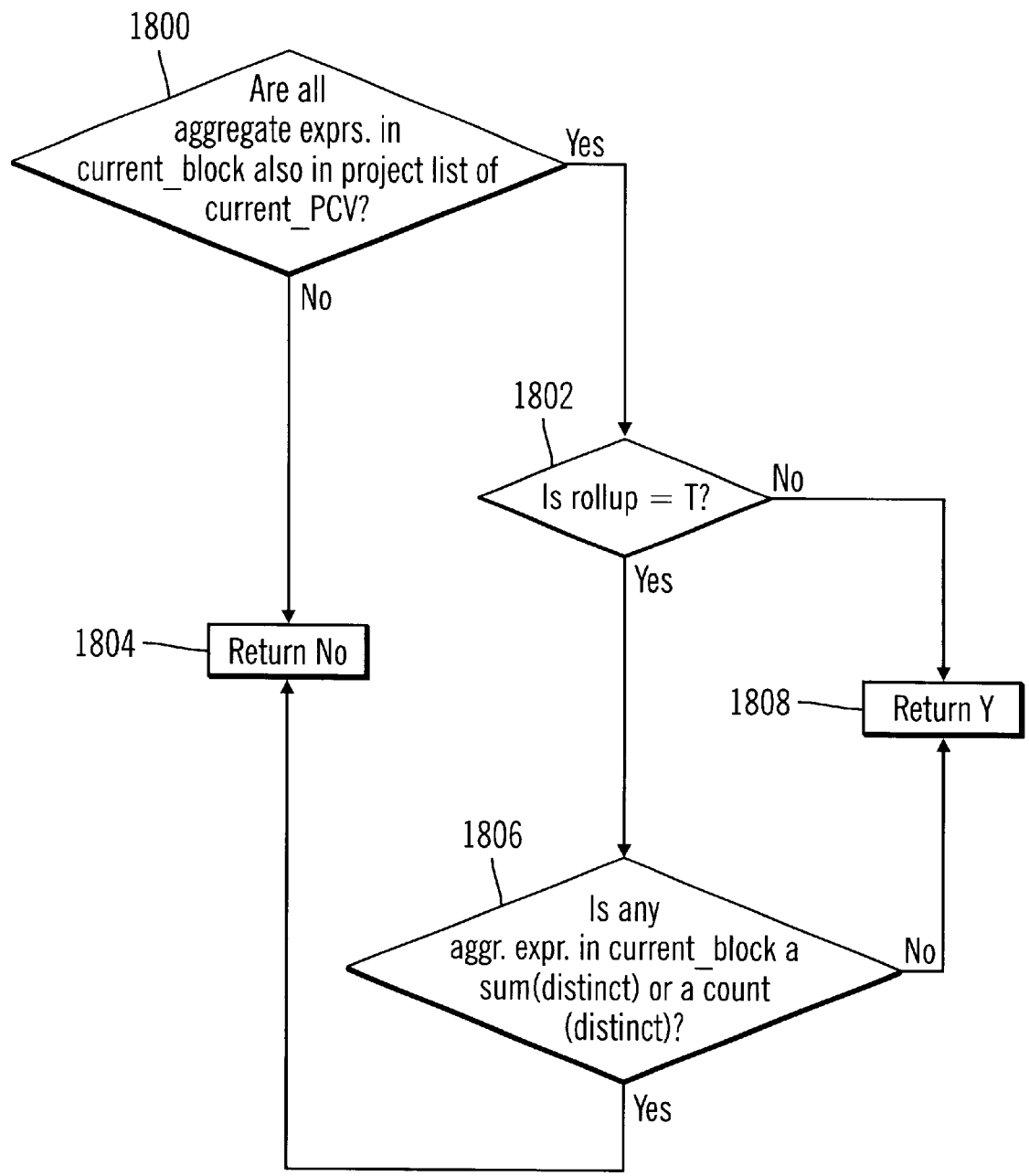

FIG. 16 is a flow diagram for the determination of whether a check on column references is okay, such as the determination in step 1118 of FIG. 10. Extra_block_proj is set equal to expressions projected from current_block but not projected from current_PCV, via step 1700. These expressions could include subqueries, for example, "select A, (select . . . )", where (select . . . ) is a subquery.

Extra_block_col_refs are set equal to all columns (not in an aggregate expression) where columns are in an expression in extra_block_proj and reference a table or subquery in current_block (includes all current references to current_block), via step 1702. Current_extra_col_ref is set equal to first element of extra_block_col_ref, via step 1704.

It is then determined whether current_extra_col_ref is equal to Ø, via step 1706. If it is Ø, then yes is returned, via step 1708. If, however, current_extra_col_ref is not Ø, via step 1706, then it is determined whether current_extra_col_ref is in the projection list of current_PCV, via step 1710. The projection list refers to expressions in a select clause of an SQL query. If it is in the projection list, then current_extra_col_ref is set equal to next element of extra_block_col_refs, via step 1714. And it is then determined whether current_extra_col_ref equals null, via step 1706.

If current_extra_col_ref is not in the projection list of current_PCV, via step 1710, then it is determined whether some combination of columns in the intersection of the select list and the group list of current_PCV functionally determine current_extra_col_ref via predicates in current_block that are not in current_PCV, via step 1712. If is does not functionally determine current_extra_col_ref, then No is returned, via step 1718. If, however, some combination of columns projected from current_PCV do functionally determine current_extra_col_ref, via step 1712, then complex_rollup is set equal to true, and current_extra_col_ref is added to extra_cols, via step 1716. Additionally, current_extra_col_ref is set equal to the next element of extra_block_col_refs, via step 1714.

FIG. 18 is a flow diagram of a determination of whether aggregate check is okay, such as the determination of step 1120 of FIG. 10. It is determined whether all aggregate expressions in current_block are also in the projection list in current_PCV, via step 1800. Note that for purposes of this example of a method according to an embodiment of the present invention, it is assumed that Avg (x) is transformed to Sum (x)/Count (x).

If they are in the projection list of current_PCV, then it is determined if rollup equals true, via step 1802. If rollup does not equal true, then yes is returned, via step 1808. If rollup does equals true, via step 1802, then it is determined if any aggregate expression in current_block is a sum (distinct) or a count (distinct), via step 1806. If the determination of step 1806 is no, then yes is returned, via step 1808. If, however, the determination of step 1806 is yes, then no is returned, via step 1804. If all aggregate expressions in current_block are not also in the projection list of current_PCV, via step 1800, then No is returned via step 1804.

FIGS. 18A–18D are examples of flow diagrams for rewriting a query block according to an embodiment of the present invention, such as that required by step 1122 of FIG. 10. This method builds a current rewritten block from current_block and current_PCV.

Rollup_Tables is set equal to { }, and Rollup_Predicates is set equal to { }, via step 1900. It is then determined whether complex_rollup equals True, via step 1902. If it is true, then the flow diagram of FIG. 18C is referenced. If it is not true, then current_rewrite "from" clause is set to (aggregate table of current_PCV) plus (all tables in current_block but not in current_PCV) plus (Rollup_Tables), via step 1904.

Current_rewrite "where" clause is set to all preds in the current_block but not in the current_PCV plus Rollup_Predicates, via step 1906. It is then determined whether rollup equals T, via step 1908. If rollup equals T, then current_rewrite "group by" clause is set to the grouping columns of the current_block, via step 1910. If, however, rollup does not equal T, then "select", "order by," "reset by," "break by," clauses of current_rewrite are initialized to those of current_block, via step 1912.

Figure 18A:
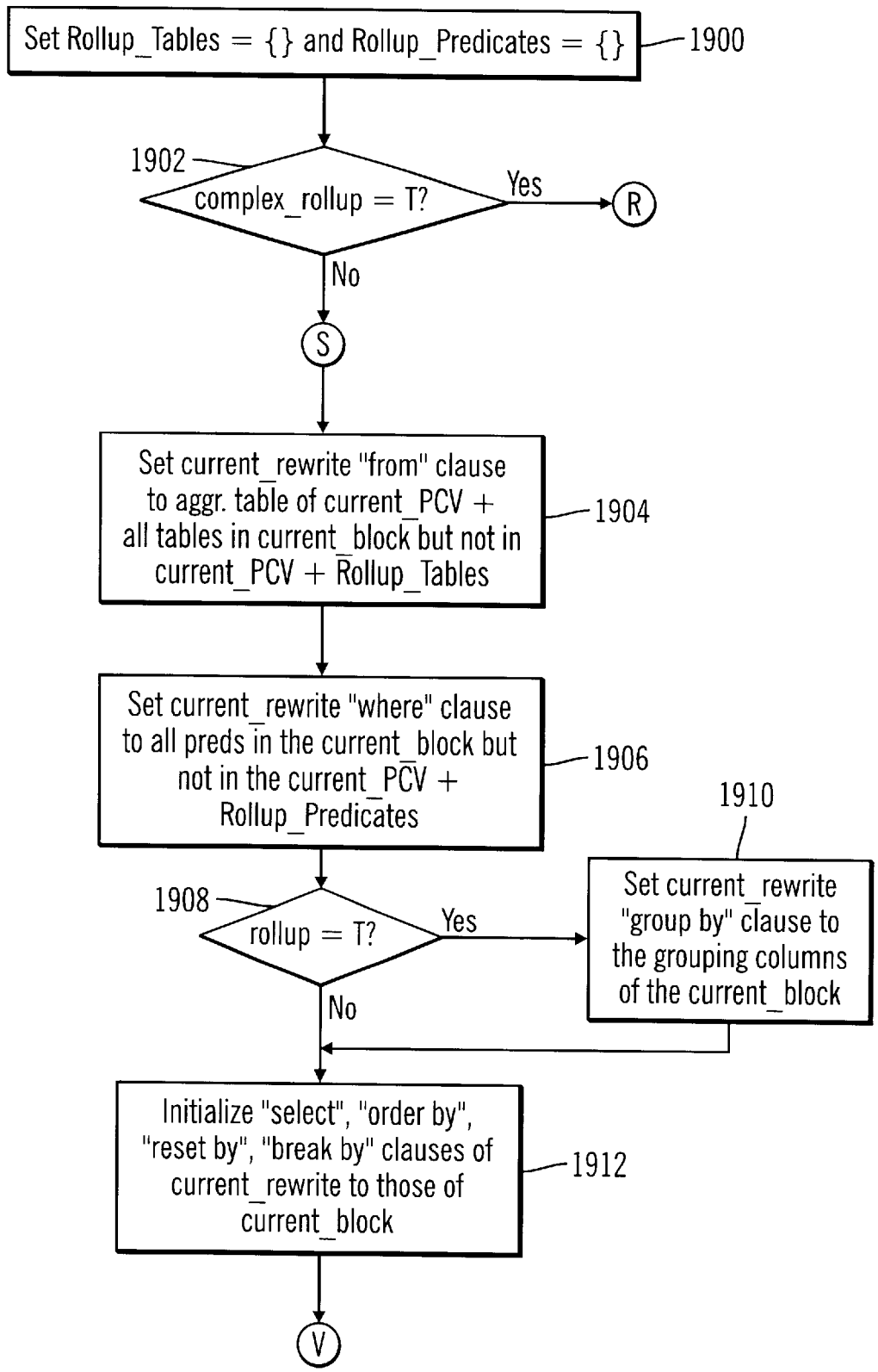
Figure 18B:
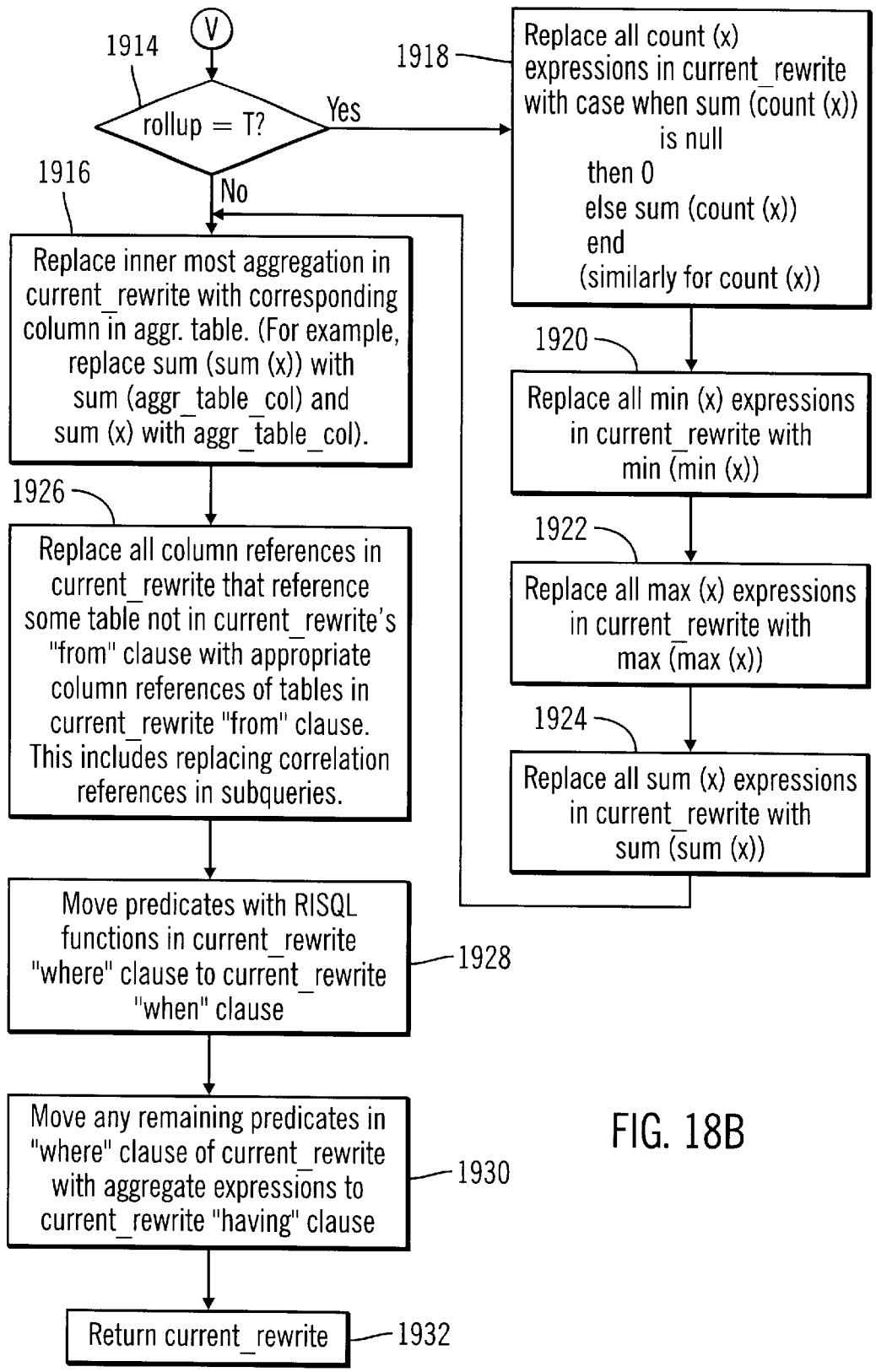
Figure 18C:
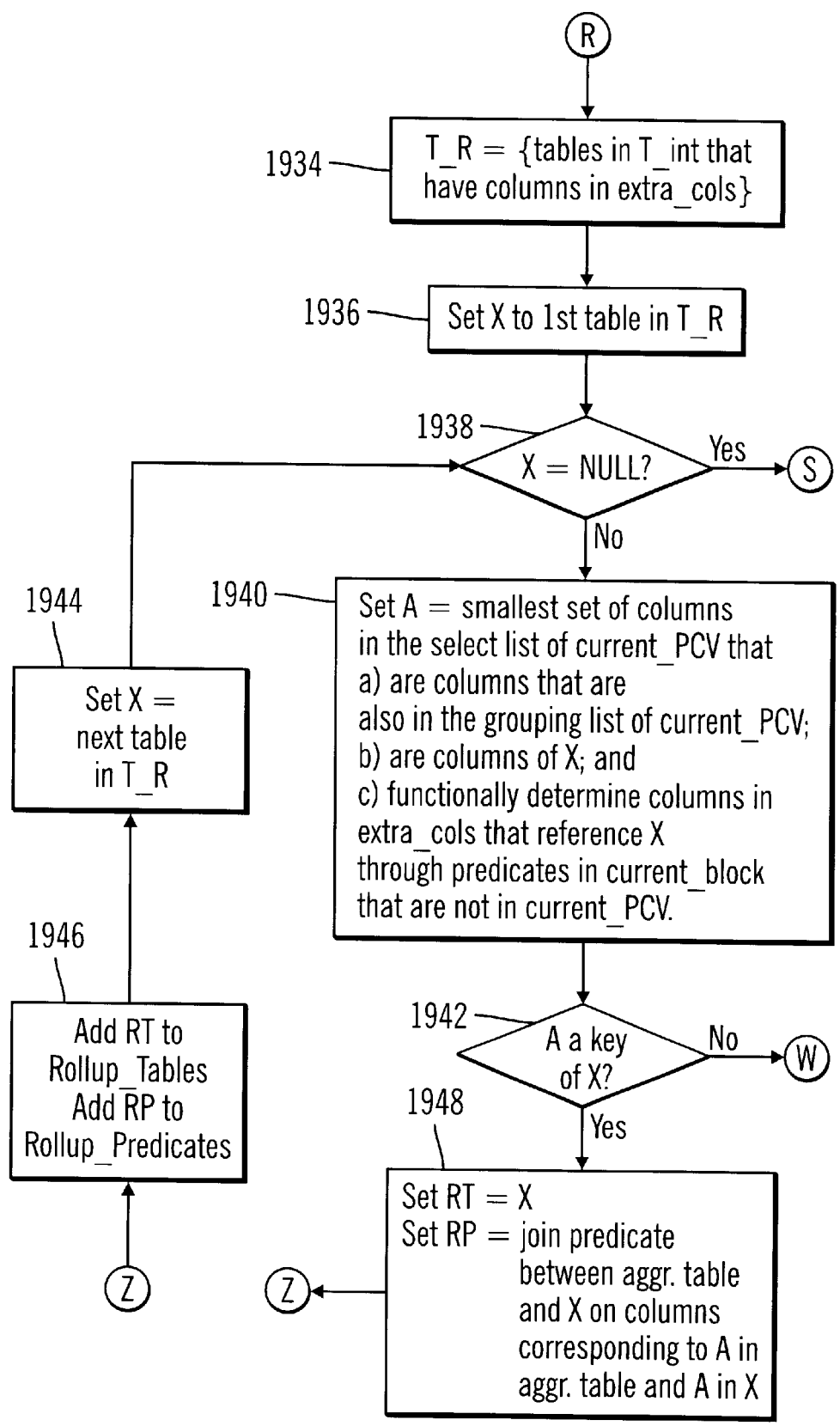

The flow diagram of FIG. 18A continues on FIG. 18B. It is determined whether rollup equals True, via step 1914. If rollup equals true, then all count (x) expressions in current_rewrite are replaced with case when sum (count (x)) is null then 0 else sum (count (x)), end (similarly for count (x)), via step 1918. All min (x) expressions in current_rewrite are then replaced with min (min (x)), via step 1920. All max (x) expressions in current_rewrite are then replaced with max (max (x)), via step 1922. All sum (x) expressions in current_rewrite are then replaced with sum (sum (x)), via step 1924. Thereafter, Additionally, if rollup is not equal to true, via step 1914, then all innermost aggregations in current_rewrite are replaced with corresponding columns in aggregate table, via step 1916. For example, replace sum (sum (x)) with sum (aggr_table_col) and sum (x) with aggr_table_col. All column references in current_rewrite that reference some table not in current_rewrite's "from" clause are replaced with appropriate column references of tables in current_rewrite "from" clause, via step 1926. This includes replacing correlation references in subquiries. Predicates with RISQL functions in current_rewrite "where" clause are then moved to current_rewrite "when" clause, via step 1928. Any remaining predicates in "where" clause of current_rewrite with aggregate expressions are then moved to current_rewrite "having" clause, via step 1930. Current_rewrite is then returned, via step 1932.

The flow diagram of FIG. 18C is referenced when complex_rollup does equal true, via step 1902 of FIG. 18A. When complex_rollup does equal true, via step 1902, then T_R is set equal to {tables in Tint that have columns in extra_cols }, via step 1934. X is then set to first table in T_R, via step 1936. It is then determined whether X is Null, via step 1938. If X is null, then perform step 1904 of FIG. 18A.

If, however, X is not null, via step 1938, then A is set equal to a smallest set of columns in the select list of current_PCV that a) are columns that are also in the grouping list of current PCV; b) are columns of X; and c) functionally determine columns in extra_cols that reference X through predicates in current_block that are not in current_PCV, via step 1940.

Figure 18D:
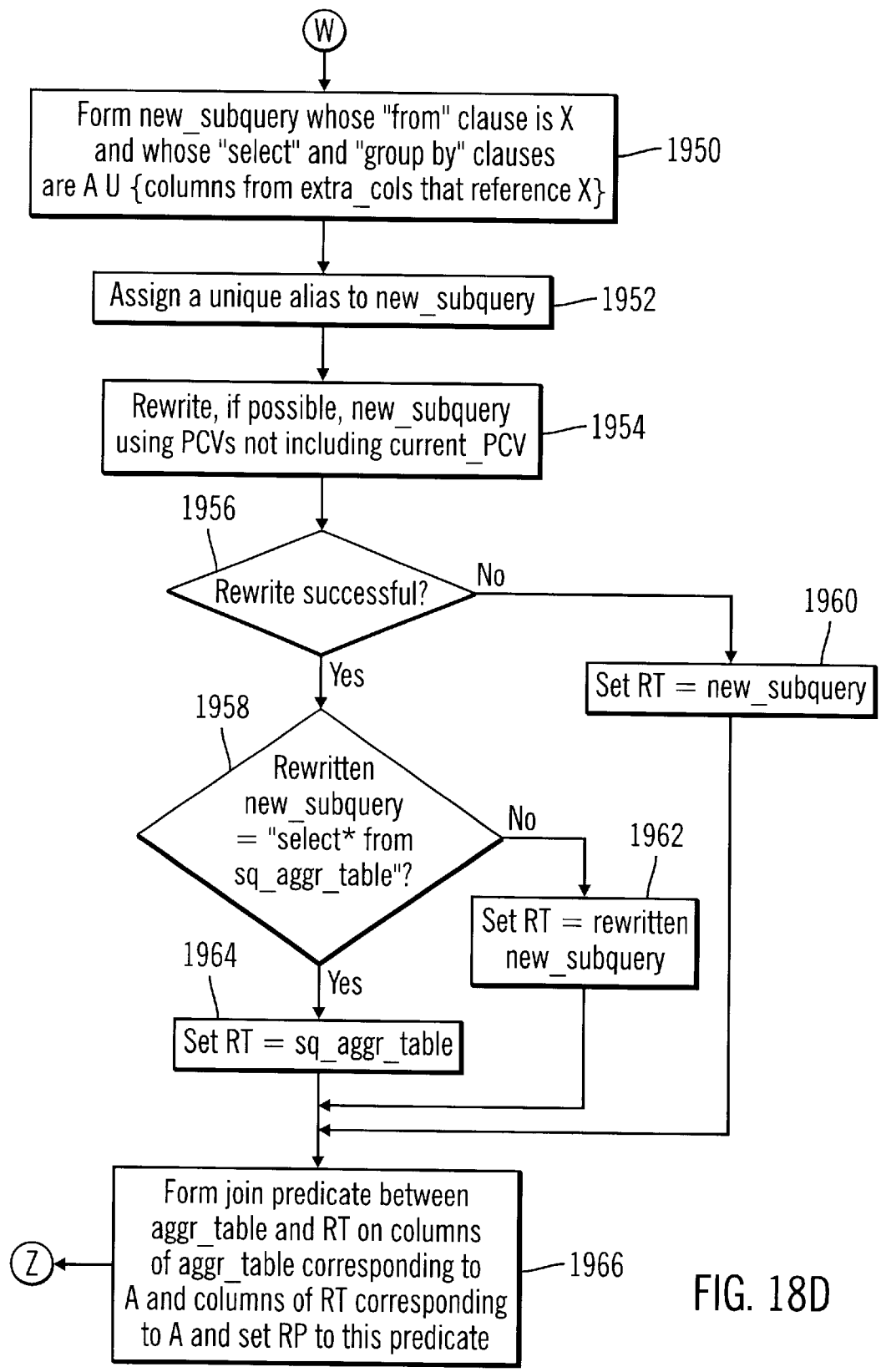

It is then determined whether A is a key of X, via step 1942. If A is not a key of X, then the flow diagram of FIG. 18D is referenced. If, however, A is a key of X, then RT is set equal to X, and RP is set equal to a join predicate between aggregate table and X on columns corresponding to A in aggregate table and A in X, via step 1948. Thereafter, RT is added to Rollup_Tables, and RP is added to Rollup_Predicates, via step 1946. X is then set equal to next table in T_R, via step 1944.

FIG. 18D is referenced when A is not a key of X, via step 1942 of FIG. 18C. New_subquery is formed whose "from" clause is X and whose "select" and "group by" 5 clauses are A U {columns from extra_cols that reference X}, via step 1950. A unique alias is assigned to new_subquery, via step 1952. New_subquery is rewritten, if possible, using PCVs not including current_PCV, via step 1954. It is then determined whether rewrite is successful, via step 1956. If it was not successful, then RT is set equal to new_subquery, via step 1960, and step 1966 is performed.

If rewrite was successful, via step 1956, then it is determined whether rewritten new_subquery equals "select*from sq_aggr_table". If not, then RT is set equal to rewritten new_subquery, via step 1962. If, however, rewritten new_subquery equals "select*from sq_aggr_table", via step 1958, then RT is set equal to sq_aggr_table, via step 1964. Thereafter, join predicate between aggr_table and RT are formed on columns of aggr_table corresponding to A and columns of RT corresponding to A and set RP to this predicate, via step 1966.

Figure 19:
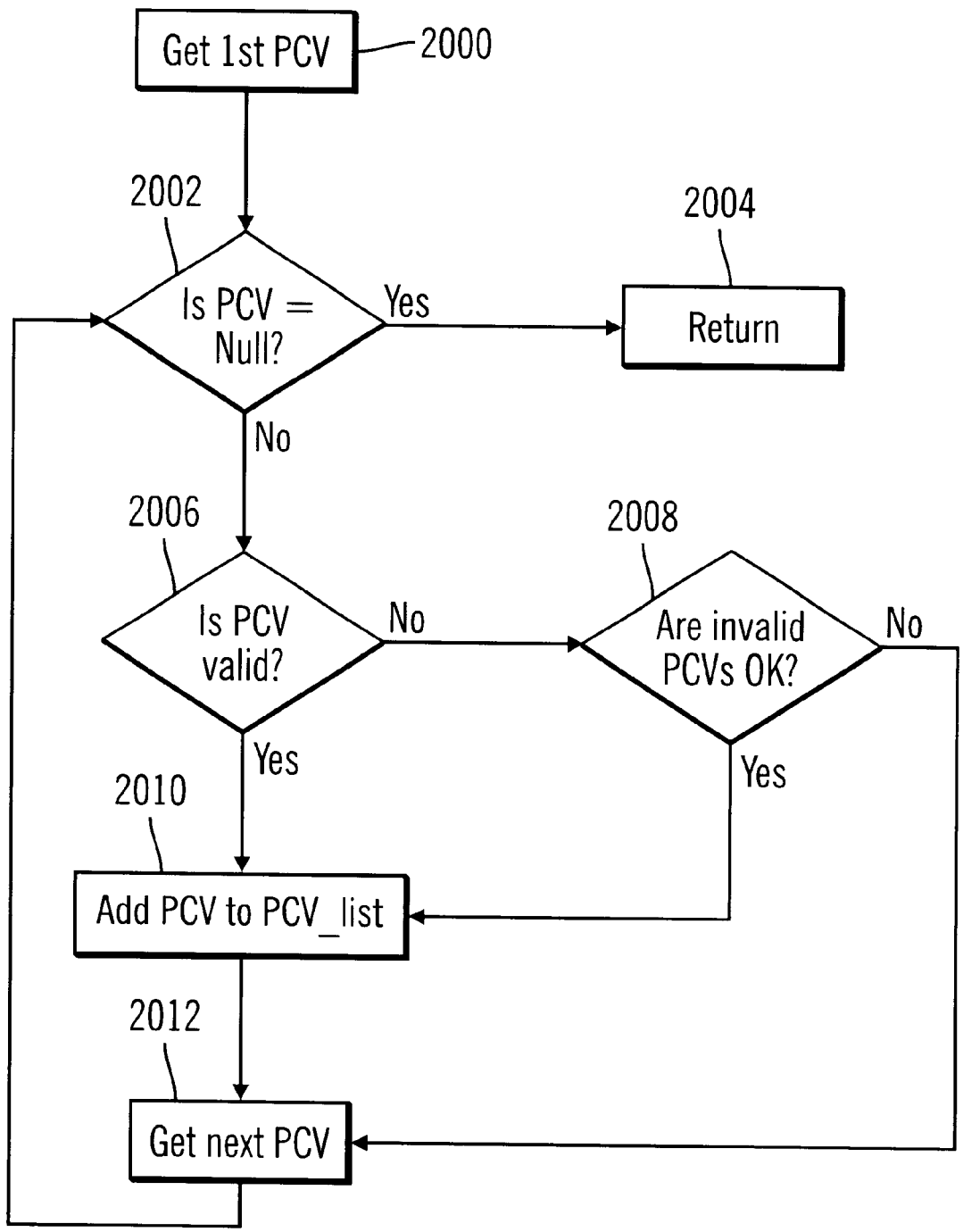

FIG. 19 is flow diagram of an example of a method according to an embodiment of the present invention of forming a list of all relevant PCVs, such as the list recited in step 1002 of FIG. 9. The first PCV is retrieved via step 2000. As previously mentioned, PCVs can be created and stored by a user, such as a database administrator. It is then determined if the PCV equals Ø, via step 2002. If the PCV equals Ø, then return to FIG. 9, via step 2004. If, however, PCV does not equal Ø, via step 2002, then it is determined whether the PCV is valid, via step 2006. A PCV can have a valid status through the use of a flag utilized by a database administrator. If the PCV is not valid, it is determined whether invalid PCVs are desired, via step 2008. The database administrator can indicate whether invalid PCVs may be utilized. If the PCV is valid, via step 2006, then the PCV is added to PCV_list, via step 2010. The next PCV is retrieved via step 2012.

If invalid PCVs are approved to be utilized, via step 2008, then the invalid PCV is also added to PCV_list, via step 2010, and the next PCV is retrieved via step 2012. If the PCV is not valid, via step 2006, and invalid PCVs are not approved to be utilized, via step 2008, then the next PCV is retrieved, via step 2012.

A method and system for rewriting relational database queries has been disclosed. Software written according to embodiments of the present invention may be stored in some form of computer memory or CD ROM, or transmitted over a network, and executed by a processor.

Although the present invention has been described in accordance with the embodiments shown, one of ordinary skill in the art will readily recognize that there could be variations to the embodiments and these variations would be within the spirit and scope of the present invention. Accordingly, many modifications may be made by one of ordinary skill in the art without departing from the spirit and scope of the appended claims.

What is claimed is:

1. A method for answering a database query comprising the acts of:

receiving a database query;

determining if the database query should be rewritten; and rewriting the database query by utilizing functional dependencies, the rewriting being performed if it is determined that the query should be rewritten, and wherein each of the functional dependencies comprises a constraint.

2. The method of claim 1, wherein the database query is a relational database query.

3. The method of claim 1, wherein the step of determining if the query should be rewritten includes a substep of determining if a first precomputed view may be utilized to rewrite the query.

4. The method of claim 3, wherein the substep of determining if the first precomputed view may be utilized to rewrite the query further includes a substep of determining whether the query includes a select statement.

5. The method of claim 3, wherein the substep of determining if the first precomputed view may be utilized to rewrite the query further includes a substep of determining whether the first precomputed view matches the query.

6. The method of claim 3, wherein the substep of determining if the first precomputed view may be utilized to rewrite the query further includes a substep of determining whether at least one aggregate expression in the query is defined over a table, wherein the table is referenced by both the query and the first precomputed view.

7. The method of claim 3, wherein the substep of determining if the first precomputed view may be utilized to rewrite the query further includes a substep of determining whether at least one aggregate expression in the query is a count (*).

8. The method of claim 3, wherein the substep of determining if the first precomputed view may be utilized to rewrite the query further includes a substep of determining if at least one grouping expression of the query and the first precomputed view is acceptable.

9. The method of claim 3, wherein the substep of determining if the first precomputed view may be utilized to rewrite the query further includes a substep of determining if at least one column reference of the query and the first precomputed view is acceptable.

10. The method of claim 3, wherein the substep of determining if the first precomputed view may be utilized to rewrite the query further includes a substep of determining if at least one aggregate expression included in the query is acceptable.

11. The method of claim 3, further including a substep of determining if a second precomputed view may be utilized to rewrite the query if the first precomputed view may not be used to rewrite the query.

12. The method of claim 1, wherein the step of determining if the query should be rewritten includes a substep of determining if answering a first rewritten query is estimated to be more cost effective than answering the query.

13. The method of claim 12, further including a substep of utilizing the first rewritten query if answering the first rewritten query is estimated to be more cost effective than answering the query.

14. The method of claim 12, further including a substep of determining if answering a second rewritten query is estimated to be more cost effective than answering the query, if answering the first rewritten query is not estimated to be more cost effective than answering the query.

15. The method of claim 1, wherein the step of determining if the query should be rewritten includes a substep of determining an estimated most cost effective rewritten query from a plurality of rewritten queries.

16. The method of claim 1, further including a substep of determining if answering the estimated most cost effective rewritten query is estimated to be more cost effective than answering the query.

17. The method of claim 16, further including a substep of utilizing of the estimated most cost effective rewritten query if answering the estimated most cost effective rewritten query is estimated to be more cost effective than answering the query.

18. The method of claim 1, wherein the step of determining if the query should be rewritten includes a sub step of determining if the query includes at least one of aggregation, distinct, and grouping.

19. The method of claim 18, wherein rewriting of the query is performed if the query includes at least one of aggregation, distinct, and grouping.

20. The method of claim 1, wherein the query includes at least one subquery, and wherein the rewriting of the query includes a substep of recursively attempting to rewrite the at least one subquery.

21. The method of claim 1, wherein the predefined hierarchy of data allows a rollup of aggregates on points in a dimension to other points of courser coarser granularity in the same dimension.

22. The method of claim 1, wherein the step of rewriting the query includes a substep of deriving a table to facilitate utilizing a precomputed view to rewrite the query.

23. The method of claim 22, wherein the derivation of the table occurs in real time.

24. The method of claim 1, wherein the determination includes evaluating foreign key-primary key relationships.

25. The method of claim 1, wherein one of the functional dependencies is from a primary key of a database table to a column in the database table.

26. The method of claim 1, wherein one of the functional dependencies is based on a foreign key/primary key relationship.

27. The method of claim 1, wherein the query includes one or more subqueries, and wherein the rewriting step comprises rewriting only a portion of the query.

28. A system for answering a database query, the system comprising:

means for receiving a database query;

means for determining if the query should be rewritten; and means for rewriting the database query by utilizing functional dependencies, the rewriting being performed if it is determined that the query should be rewritten, and wherein each of the functional dependencies comprises a constraint.

29. A computer program product, for answering a database query, the computer program product comprising:

computer code for receiving a database query;

computer code for determining if the query should be rewritten; and computer code for rewriting the database query by utilizing functional dependencies, the rewriting being performed if it is determined that the query should be rewritten, and wherein each of the functional dependencies comprises a constraint.

30. The computer program product of claim 29, wherein the computer readable medium is selected from the group consisting of CD-ROM, floppy disk, tape, flash memory, system memory, hard drive, and data signal embodied in a carrier wave.

* * * * *